(12) United States Patent
Hasegawa et al.

(10) Patent No.: US 8,066,826 B2
(45) Date of Patent: Nov. 29, 2011

(54) ROLLING-CONTACT SHAFT WITH JOINT CLAW

(75) Inventors: Hisataka Hasegawa, Iwata (JP); Yasuyuki Watanabe, Iwata (JP)

(73) Assignee: NTN Corporation, Osaka (JP)

( * ) Notice: Subject to any disclaimer, the term of this patent is extended or adjusted under 35 U.S.C. 154(b) by 646 days.

(21) Appl. No.: 11/501,816

(22) Filed: Aug. 10, 2006

(65) Prior Publication Data

US 2007/0034301 A1     Feb. 15, 2007

(30) Foreign Application Priority Data

Aug. 10, 2005    (JP) ................................. 2005-232314

(51) Int. Cl.
        *C23C 8/26*         (2006.01)

(52) U.S. Cl. ......................................................... 148/318

(58) Field of Classification Search ................... 148/318
See application file for complete search history.

(56) References Cited

U.S. PATENT DOCUMENTS

| | | |
|---|---|---|
| 3,954,517 A | 5/1976 | Jatczak et al. |
| 4,162,419 A | 7/1979 | DeAngelis |
| 4,930,909 A | 6/1990 | Murakami et al. |
| 4,971,634 A | 11/1990 | Shibata et al. |
| 5,085,733 A | 2/1992 | Mitamura |
| 5,129,966 A | 7/1992 | Rao |
| 5,137,375 A | 8/1992 | Murakami et al. |
| 5,180,450 A | 1/1993 | Rao |
| 5,338,377 A | 8/1994 | Mitamura et al. |
| 5,352,203 A | 10/1994 | Murakami et al. |
| 5,352,303 A | 10/1994 | Murakami et al. |
| 5,375,323 A | 12/1994 | Sata |
| 5,413,643 A | 5/1995 | Murakami et al. |
| 5,427,457 A | 6/1995 | Furumura et al. |
| 5,427,600 A | 6/1995 | Itoh et al. |
| 5,456,136 A | 10/1995 | Yamashita et al. |
| 5,456,766 A | 10/1995 | Beswick et al. |
| 5,595,610 A | 1/1997 | Maeda et al. |
| 5,611,250 A | 3/1997 | Narai et al. |
| 5,658,082 A | 8/1997 | Tsushima et al. |
| 5,733,667 A | 3/1998 | Nakasuji et al. |

(Continued)

FOREIGN PATENT DOCUMENTS

CN          1344932        4/2002

(Continued)

OTHER PUBLICATIONS

Japanese Office Action, with English Translation, issued in Japanese Patent Application No. 2002-194775, dated on Mar. 22, 2006.

(Continued)

*Primary Examiner* — Jessee R. Roe
(74) *Attorney, Agent, or Firm* — McDermott Will & Emery LLP

(57) ABSTRACT

A steel-made rolling-contact shaft with a joint claw improved in both the rolling contact fatigue life at the raceway and the static fracture strength (torsional strength) at the claw includes a joint claw at one end, and has a portion of the outer cylindrical surface functioning as a raceway of a needle roller qualified as a rolling element of a needle bearing. The joint claw is subjected to tempering by induction heating. A nitrogen-enriched layer is formed at the surface layer of the rolling-contact shaft with a joint claw. The grain size number of austenite grains in the nitrogen-enriched layer exceeds number 10. The hydrogen content of the rolling-contact shaft with a joint claw is not more than 0.5 ppm.

4 Claims, 13 Drawing Sheets

U.S. PATENT DOCUMENTS

| | | | |
|---|---|---|---|
| 5,772,956 A | 6/1998 | Hasegawa et al. |
| 5,775,280 A | 7/1998 | Schmidt et al. |
| 5,792,286 A | 8/1998 | Inoue et al. |
| 5,803,993 A | 9/1998 | Yoshida et al. |
| 5,848,846 A | 12/1998 | Sugiyama et al. |
| 5,853,249 A | 12/1998 | Maeda et al. |
| 5,944,916 A | 8/1999 | Chung |
| 5,972,130 A | 10/1999 | Underys et al. |
| 5,979,383 A | 11/1999 | Faville et al. |
| 6,012,851 A | 1/2000 | Hirakawa et al. |
| 6,086,686 A | 7/2000 | Tanaka et al. |
| 6,095,692 A | 8/2000 | Takemura |
| 6,149,734 A | 11/2000 | Isogai et al. |
| 6,158,263 A | 12/2000 | Maeda et al. |
| 6,165,289 A | 12/2000 | Matsumoto et al. |
| 6,224,688 B1 | 5/2001 | Takemura et al. |
| 6,251,198 B1 | 6/2001 | Koo et al. |
| 6,258,179 B1 | 7/2001 | Takayama et al. |
| 6,290,398 B1 | 9/2001 | Fujiwara et al. |
| 6,306,227 B2 | 10/2001 | Okayama et al. |
| 6,309,475 B1 | 10/2001 | Takayama et al. |
| 6,328,009 B1 | 12/2001 | Brothers |
| 6,342,109 B1 | 1/2002 | Takemura et al. |
| 6,423,158 B1 | 7/2002 | Maeda et al. |
| 6,440,232 B1 | 8/2002 | Takemura et al. |
| 6,447,619 B1 | 9/2002 | Takayama et al. |
| 6,488,798 B1 | 12/2002 | Tajima et al. |
| 6,532,920 B1 | 3/2003 | Sweetnam et al. |
| 6,582,532 B1 | 6/2003 | Kurebayashi et al. |
| 6,602,358 B1 | 8/2003 | Ochi et al. |
| 6,641,680 B2 | 11/2003 | Nishimori et al. |
| 6,699,335 B2 | 3/2004 | Murakami et al. |
| 6,855,217 B2 | 2/2005 | Suzuki |
| 7,147,382 B2 | 12/2006 | Suzuki et al. |
| 2002/0043111 A1 | 4/2002 | Takagi et al. |
| 2002/0082133 A1 | 6/2002 | Yoshikawa et al. |
| 2002/0088511 A1 | 7/2002 | Nakamura et al. |
| 2002/0159905 A1 | 10/2002 | Bachmann et al. |
| 2003/0037635 A1 | 2/2003 | Tsuchiyama et al. |
| 2003/0040401 A1 | 2/2003 | Okita et al. |
| 2003/0063829 A1 | 4/2003 | Tamada et al. |
| 2003/0075244 A1 | 4/2003 | Kurebayashi et al. |
| 2003/0123769 A1 | 7/2003 | Ohki |
| 2004/0079310 A1 | 4/2004 | Suzuki et al. |
| 2004/0170348 A1 | 9/2004 | Okugami et al. |
| 2004/0170761 A1 | 9/2004 | Li et al. |
| 2004/0179761 A1 | 9/2004 | Ohki et al. |
| 2004/0228561 A1 | 11/2004 | Okugami et al. |
| 2005/0045247 A1 | 3/2005 | Ohki |
| 2005/0109308 A1 | 5/2005 | Suzuki et al. |
| 2005/0205163 A1 | 9/2005 | Ohki |
| 2007/0151633 A1 | 7/2007 | Ohki et al. |
| 2007/0169850 A1 | 7/2007 | Ohki et al. |

FOREIGN PATENT DOCUMENTS

| | | |
|---|---|---|
| CN | 1351694 A | 5/2002 |
| CN | 1421541 | 6/2003 |
| DE | 4 204 982 A1 | 8/1993 |
| DE | 199 60 803 A1 | 6/2000 |
| DE | 102 54 635 A1 | 6/2003 |
| EP | 0 458 646 | 11/1991 |
| EP | 0 600 421 | 6/1994 |
| EP | 0 626 468 A1 | 11/1994 |
| EP | 0 723 034 A2 | 7/1996 |
| EP | 0 811 789 A1 | 12/1997 |
| EP | 0 950 723 A1 | 10/1999 |
| EP | 1 070 760 A2 | 1/2001 |
| EP | 1 158 064 A1 | 11/2001 |
| EP | 1 273 672 A1 | 1/2003 |
| EP | 1 411 142 A1 | 4/2004 |
| FR | 2 841 907 | 1/2004 |
| GB | 2 258 274 A | 2/1993 |
| JP | 28-028308 | 4/1973 |
| JP | 48-028308 | 4/1973 |
| JP | 63-185917 | 11/1988 |
| JP | 02-125841 A | 5/1990 |
| JP | 02-190615 | 7/1990 |
| JP | 03-116706 | 12/1991 |
| JP | 04-254574 | 9/1992 |
| JP | 05-009584 | 1/1993 |
| JP | 05-118336 | 5/1993 |
| JP | 05-163563 A | 6/1993 |
| JP | 05-179350 | 7/1993 |
| JP | 05-263091 | 10/1993 |
| JP | 6-101424 | 4/1994 |
| JP | 06-117438 | 4/1994 |
| JP | 6-247253 | 9/1994 |
| JP | 6-286577 | 10/1994 |
| JP | 06-341441 | 12/1994 |
| JP | 07-027139 | 1/1995 |
| JP | 08-004774 | 1/1996 |
| JP | 08-049057 | 2/1996 |
| JP | 08-233070 | 9/1996 |
| JP | 08-311603 | 11/1996 |
| JP | 09-053148 | 2/1997 |
| JP | 09-176740 | 7/1997 |
| JP | 09-316601 | 12/1997 |
| JP | 09-329139 | 12/1997 |
| JP | 10-030150 | 2/1998 |
| JP | 10-047334 | 2/1998 |
| JP | 10-068419 | 3/1998 |
| JP | 10-103339 | 4/1998 |
| JP | 10-110720 | 4/1998 |
| JP | 10-168515 | 6/1998 |
| JP | 10-184701 | 7/1998 |
| JP | 10-204612 | 8/1998 |
| JP | 10-231908 | 9/1998 |
| JP | 11-080897 | 3/1999 |
| JP | 11-101247 | 4/1999 |
| JP | 11-140543 | 5/1999 |
| JP | 11-222627 | 8/1999 |
| JP | 11-303874 | 11/1999 |
| JP | 2000-018255 | 1/2000 |
| JP | 2000-038906 | 2/2000 |
| JP | 2000-038907 | 2/2000 |
| JP | 2000-54810 | 2/2000 |
| JP | 2000-129347 | 5/2000 |
| JP | 2000-205284 | 7/2000 |
| JP | 2000-212721 | 8/2000 |
| JP | 2001-123244 | 5/2001 |
| JP | 2001-200314 | 7/2001 |
| JP | 2002-031212 | 1/2002 |
| JP | 2002-070872 | 3/2002 |
| JP | 2002-120508 | 4/2002 |
| JP | 2002-180203 | 6/2002 |
| JP | 2002-194438 | 7/2002 |
| JP | 2002-256336 | 9/2002 |
| JP | 2002-339054 | 11/2002 |
| JP | 2003-56315 | 2/2003 |
| JP | 2003-083337 | 3/2003 |
| JP | 2003-083339 | 3/2003 |
| JP | 2003-156050 | 5/2003 |
| JP | 2003-226918 | 8/2003 |
| JP | 2003-226919 | 8/2003 |
| JP | 2003-287035 | 10/2003 |
| JP | 2003-294034 | 10/2003 |
| JP | 2003-2940384 | 10/2003 |
| WO | WO 91/00929 | 1/1991 |
| WO | WO0240730 | 11/2001 |
| WO | WO 0240730 | 5/2002 |

OTHER PUBLICATIONS

Japanese Office Action, with English Translation, issued in Japanese Patent Application No. 2002-194793, dated on Mar. 22, 2006.

Japanese Office Action, with English Translation, issued in Japanese Patent Application No. 2002-194804, dated on Mar. 20, 2007.

Japanese Office Action, with English Translation, issued in Japanese Patent Application No. 2002-194804, dated on Nov. 28, 2006.

Japanese Office Action, with English Translation, issued in Japanese Patent Application No. 2002-194921, dated on Nov. 28, 2006.

Japanese Office Action, with English Translation, issued in Japanese Patent Application No. 2002-303036, dated on Apr. 25, 2006.

Japanese Office Action, with English Translation Issued in Japanese Patent Application No. 2002-303036, dated on Oct. 24, 2006.

Japanese Office Action, with English Translation, issued in Japanese Patent Application No. 2003-209737, dated on Feb. 6, 2007.
Japanese Office Action, with English Translation, issued in Japanese Patent Application No. 2002-194804, dated on Mar. 20, 2007.
European Search Report, issued in European Patent Application No. 05703409.2-2424, dated on Apr. 4, 2007.
Chinese Office Action, with English Translation, issued in Chinese Patent Application No. 200410008248.9, dated on Apr. 27, 2007.
Annual book of ASTM Standards Section Three Metals Test Methods and Analytical Procedures, 2003, vol. 03.01, ASTM, International Standards Worldwide.
JIS G 0551 "Methods of austenite grain size determination for steel", Published by Japanese Standards Association, Feb. 20, 1998.
JIS Z 2242 "Method of impact test for metallic materials", Published by Japanese Standards Association, Dec. 21, 1998.
JIS Z 2202 "Test pieces for impact test for metallic materials" Published by Japanese Standards Association, Feb. 20, 1998.
Burrier, Jr., H., "Hardenability of Carbon and Low-Alloy Steels", 2002, ASM International.
Vander Voort, G., "Embrittlement of Steels", 2002 ASM International.
Kim, C., et al., "Influence of Subzero and Shot-Peening Treatments on Impact and Fatigue Fracture Properties of Case-Hardened Steels", J. Heat Treat., Jun. 1981, pp. 43-53, vol. 2 No. 1.
US Office Action, issued in U.S. Appl. No. 10/686,766, dated on Oct. 26, 2007.
US Office Action, issued in U.S. Appl. No. 10/787,221, dated on Nov. 7, 2007.
U.S. Appl. No. 10/585,646, filed Jul. 7, 2006.
Japanese Office Action, with English translation, issued in Japanese Patent Application No. JP 2004-053995 dated on Jun. 17, 2008.
"Technical Means for Improvement of Service Life of a Rolling Bearing," Bearing, No. 5, 2001, pp. 1, 2, 5, 45; w/ English translation of relevant portion.
"Metallic Material Refining Technology," May 1995, p. 47; w/ English translation of relevant portion.
Chinese Office Action, w/ English translation thereof, issued in Chinese Patent Application No. 200610004620.8 dated on Sep. 5, 2008.
European Search Report issued in European Patent Application No. EP 04807374.6 dated Dec. 18, 2008.
Chinese Office Action, w/ English translation thereof, issued in Chinese Patent Application No. CN 200710146997.1 dated Dec. 26, 2008.
U.S. Office Action issued in U.S. Appl. No. 10/585,646 dated Jan. 16, 2009.
Chinese Office Action, with English Translation, issued in Chinese Patent Application No. CN 200710146996.7, dated Feb. 6, 2009.
Japanese Notice of Grounds of Rejection, w/ English translation thereof, issued in Japanese Patent Application No. JP 2006-139254 dated May 26, 2009.
United States Office Action issued in U.S. Appl. No. 10/897,016 dated May 27, 2009.
United States Office Action issued in U.S. Appl. No. 10/795,389 dated Jul. 29, 2009.
United States Office Action issued in U.S. Appl. No. US 10/787,221 dated Jul. 9, 2009.
Japanese Office Action, with English translation, issued in Japanese Patent Application No. 2004-024096, mailed Jan. 19, 2010.

ROLLING-CONTACT SHAFT WITH JOINT CLAW

BACKGROUND OF THE INVENTION

1. Field of the Invention

The present invention relates to a rolling-contact shaft with a joint claw, particularly a steel-made rolling-contact shaft with a joint claw at an end, and having a portion of the outer cylindrical surface functioning as the raceway of a rolling element of a bearing.

2. Description of the Background Art

There are cases where a rolling-contact shaft with a joint claw is employed as a shaft component to transmit momentum. The rolling-contact shaft includes a claw formed at an end, coupled to another adjacent shaft, and has a portion of the outer cylindrical surface functioning as the raceway of a rolling element of a bearing. For example, a rolling-contact shaft employed in a brake actuator may have a portion of the outer cylindrical surface surrounded by a needle roller qualified as a rolling element arranged in contact with a portion thereof, and supported rotatably by a needle roller bearing absent of an inner ring. In other words, the rolling-contact shaft serves a function equivalent to an inner ring, and a portion of the outer cylindrical surface thereof functions as a raceway of a needle roller qualified as a rolling element.

When such a rolling-contact shaft is employed, rolling contact fatigue life is required at the portion of the outer cylindrical surface thereof. To this end, medium carbon steel for machine structural use (such as S53C of JIS: Japanese Industrial Standard) is employed for the raw material of the rolling-contact shaft, taking into consideration the configuration of the shaft, the manufacturing cost, and the like. Additionally, the region where hardness is required such as the region corresponding to the raceway is subjected to high frequency induction heat treatment (induction hardening). In the case where flaking will occur at the rolling-contact shaft earlier than at the bearing that supports the rolling-contact shaft, high carbon chromium bearing steel (such as SUJ2 of the JIS) is employed for the raw material in order to improve the rolling contact fatigue life of the rolling-contact shaft, and the rolling-contact shaft is subjected to high-frequency induction heat treatment (induction hardening), bright heat treatment, carbonitriding heat treatment (carbonitriding quenching), and the like. Further, manganese steel for machine structural use (such as SMn420 of the JIS), manganese chromium steel (such as SMnC420 of the JIS), chromium steel (such as SCr420 of the JIS), chromium molybdenum steel (such as SCM415 of the JIS), nickel chromium steel (such as SNC415 of the JIS), nickel chromium molybdenum steel (SNCM420 of the JIS) or the like may be employed, and subjected to high frequency induction heat treatment (induction hardening), carburizing heat treatment including high density carburizing (carburizing quenching), carbonitriding heat treatment (carbonitriding quenching), or the like.

In recent years, there is the demand for reduction in size, weight, and space of components such as brake actuators. In view of such demand, the approach of forming a joint claw at an end of the rolling-contact shaft employed as a component for a brake actuator and the like, directed to reducing space, has been employed (refer to Japanese Patent Laying-Open Nos. 06-247253 and 06-286577). Such a rolling-contact shaft with a joint claw allows direct connection between shafts without having to use a coupling that is the general member to establish connection between shafts, and also contributes to reducing the number of employed components to suppress the manufacturing cost as well as to reduce space.

The demand for reduction in size, weight, and space for components such as brake actuators also induces the demand for reduction in size, weight and space for bearings employed in such components. For example, in the case where the needle roller bearing is reduced in size in a rolling-contact shaft supported rotatably by the aforementioned needle roller bearing absent of an inner ring, the rolling-contact shaft serving a function equivalent to an inner ring is also reduced in size and has a smaller outer diameter. This means that, in the case where the same load is applied, the contact pressure between the needle roller and the outer cylindrical surface of the rolling-contact shaft will increase. As a result, the rolling contact fatigue life must be improved at a region of that outer cylindrical surface of the rolling-contact shaft. When the rolling-contact shaft is connected to another member through its joint claw in the case where the rolling-contact shaft is reduced in size, the torsional stress loaded on the claw is increased, necessitating an improvement in the torsional strength of the claw portion.

In order to improve the rolling contact fatigue life of the rolling-contact shaft, various measures are possible such as increasing the hardness of the raceway, increasing the alloy contents such as Cr contained in the steel raw material, applying carburizing or carbonitriding heat treatment, or the like. It is to be noted that such approaches may not necessarily improve the static fracture strength such as the torsional strength of the claw, and, in some cases, may degrade the strength instead. It was therefore difficult to achieve an improvement in both the rolling contact fatigue life at the raceway of the rolling-contact shaft and also the torsional strength of the claw region through the conventional approaches of improving the rolling contact fatigue life set forth above.

SUMMARY OF THE INVENTION

In view of the foregoing, an object of the present invention is to provide a rolling-contact shaft with a joint claw, aiming for an improvement in both the rolling contact fatigue life at the raceway and the static fracture strength (torsional strength) at the claw.

The rolling-contact shaft of the present invention is formed of steel, includes a joint claw at an end, and has a portion of the outer cylindrical surface functioning as the raceway of a rolling element of a bearing. The joint claw is subjected to tempering by induction heating. A nitrogen-enriched layer is formed at a surface layer of the rolling-contact shaft with a joint claw. The grain size number of austenite grains in the nitrogen-enriched layer exceeds number 10. Further, the hydrogen content of the rolling-contact shaft with a joint claw is at most 0.5 ppm.

Since a nitrogen-enriched layer is formed at the surface layer of the rolling-contact shaft with a joint claw of the present invention, tolerance against metal fatigue is improved. The metal structure is rendered fine due to the smaller austenite grains, and embrittlement of the metal structure is obviated since the hydrogen content is reduced. Accordingly, the rolling contact fatigue life at the raceway is improved, which in turn improves the rolling contact fatigue life of the rolling-contact shaft with a joint claw. At the joint claw, the metal structure is rendered fine by virtue of the smaller austenite grains, and embrittlement of the metal structure is avoided by virtue of the lower hydrogen content. The tempering process by means of induction heating allows the joint claw to be subjected to tempering while suppressing influence on the hardness at the raceway. Accordingly, toughness at the joint claw can be ensured to improve the static fracture strength (torsional strength) while maintaining a long rolling contact fatigue life at the raceway. By employing induction heating that allows local heating for the tempering process of the joint claw, the joint claw can be subjected to appropriate tempering without influence on the hardness and the like at the raceway. In accordance with the present invention, there is provided a rolling-contact shaft with a joint claw, aiming to an improvement in the rolling contact fatigue life at the raceway and also in the static fracture strength (torsional strength) of the joint claw.

In order to further increase the rolling contact fatigue life of the rolling-contact shaft with a joint claw, the nitrogen-enriched layer preferably has a thickness of at least 0.2 mm, further preferably a thickness of at least 0.3 mm, from the surface. In order to further improve the rolling contact fatigue life of the rolling-contact shaft with a joint claw and the static fracture strength of the joint claw, the grain size number of the austenite grains preferably exceeds number 11, and the hydrogen content is at most 4.0 ppm.

As used herein, the joint claw refers to a region of the rolling-contact shaft, connected to another member by being fitted with another adjacent member. The raceway refers to the portion at the surface of the rolling-contact shaft, where a rolling element such as the needle roller rolls. The surface layer of the rolling-contact shaft with a joint claw refers to a region within 0.2 mm from the surface of the rolling-contact shaft. The grain size number of the austenite grains refer to the grain size number of austenite grains defined in JIS G 0551. The nitrogen-enriched layer formed at the surface layer of the rolling-contact shaft has a nitrogen content higher than that of the core portion in the rolling-contact shaft, and can be formed by the processes of carbonitriding, nitriding, carburizing-nitriding, or the like. The nitrogen content can be measured using an electron probe micro analyzer (EPMA: wavelength dispersive X-ray micro analyzer).

Preferably in the rolling-contact shaft with a joint claw set forth above, the amount of retained austenite in at least a portion of the nitrogen-enriched layer where the surface functions as the raceway is at least 11 volume % and at most 25 volume %. The retained austenite exhibits a significant effect in improving the rolling contact fatigue life with respect to a surface-origin fracture caused by damage at the raceway (surface) of the rolling-contact shaft with a joint claw. To provide this advantage, at least 11 volume %, preferably at least 15 volume %, is required.

The high nitrogen content at the nitrogen-enriched layer causes increase in the retained austenite when quenching is carried out. The retained austenite is transformed into martensite over time during usage of the bearing. Since such transformation is accompanied with volume change, the retained austenite will become the cause of secular change (secular dimensional distortion) at the rolling-contact shaft with a joint claw. Since the secular dimensional distortion will exceeds the tolerable value of the general secular change when the amount of retained austenite exceeds 25 volume %, the amount of retained austenite in the nitrogen-enriched layer is preferably not more than 25 volume %. Further, the amount of retained austenite is preferably not more than 20 volume % in applications where the requirement on secular change is strict. By setting the amount of retained austenite to at least 11 volume % and at most 25 volume % in at least a portion of the nitrogen-enriched layer where the surface functions as the raceway, the rolling contact fatigue life with respect to a surface-origin fracture can be improved and the secular dimensional distortion can be reduced. The amount of retained austenite can be calculated based on the measurement of the diffraction intensity of the martensite $\alpha$ (211) plane and austenite $\gamma$ (220) plane using, for example, an X-ray diffractometer.

In the rolling-contact shaft with a joint claw set forth above, the amount of retained austenite in the nitrogen-enriched layer at a region of 50 μm in depth from the surface functioning as a raceway may be set to at least 11 volume % and at most 25 volume %. As mentioned above, the retained austenite exhibits a significant effect on the rolling contact fatigue life with respect to a surface-origin fracture caused by damage at the raceway (surface) of the rolling-contact shaft. To provide this advantage, the amount of retained austenite at the region in the vicinity of 50 μm in depth from the surface that functions as a raceway, particularly having a large influence on the rolling contact fatigue life with respect to a surface-origin fracture, becomes a critical factor. Therefore, by setting the amount of retained austenite in the nitrogen-enriched layer at the region of 50 μm in depth from the surface functioning as the raceway to at least 11 volume % and at most 25 volume %, the rolling contact fatigue life particularly with respect to a surface-origin fracture at a rolling-contact shaft with a joint claw can be improved.

Preferably in the rolling-contact shaft with a joint claw set forth above, the nitrogen content in the nitrogen-enriched layer is at least 0.1 mass % and at most 0.7 mass %. If the nitrogen content is less than 0.1 mass %, the tolerance with respect to metal fatigue is so low that the effect on improving the rolling contact fatigue life, particularly the rolling contact fatigue life with respect to a surface-origin fracture, is low. To improve the rolling contact fatigue life significantly, the nitrogen content in the nitrogen-enriched layer is preferably at least 0.15 mass %. If the nitrogen content exceeds 0.7 mass %, there is the possibility of voids, i.e. small holes, being generated at the surface layer. Furthermore, the amount of retained austenite will be increased than needed to degrade the surface hardness. Accordingly, the rolling contact fatigue life at the raceway of the rolling-contact shaft with a joint claw will be reduced. When the rolling-contact shaft is employed in an application where the requirement on rolling contact fatigue life is high, the nitrogen content in the nitrogen-enriched layer is preferably not more than 0.6 mass %. By setting the nitrogen content in the nitrogen-enriched layer to at least 0.1 mass % and at most 0.7 mass % in the above-described rolling-contact shaft with a joint claw, the rolling contact fatigue life, particularly the rolling contact fatigue life with respect to a surface-origin fracture, can be improved.

In the above-described rolling-contact shaft with the joint claw, the nitrogen content in the nitrogen-enriched layer at the region of 50 μm in depth from the surface may be set to at least 0.1 mass % and at most 0.7 mass %. As mentioned above, the nitrogen-enriched layer exhibits a significant effect on improving the rolling contact fatigue life particularly with the respect to a surface-origin fracture at the raceway (surface) of the rolling-contact shaft with the joint claw. To provide such an advantage, the nitrogen amount at the region in the vicinity of 50 μm in depth from the surface, particularly having a great effect on the rolling contact fatigue life with respect to a surface-origin fracture, will become a critical factor. By setting the nitrogen content in the nitrogen-enriched layer at the region of 50 μm in depth from the surface to at least 0.1 mass % and at most 0.7 mass %, the rolling contact fatigue life particularly with respect to a surface-origin fracture at the rolling-contact shaft with a joint claw can be improved.

In the rolling-contact shaft with a joint claw set forth above, the steel constituting the rolling-contact shaft contains at least 0.1 mass % and at most 1.2 mass % of carbon, and at least 0.2 mass % and at most 2.0 mass % of chromium at a region other than the surface layer region.

If the carbon content at the region other than the surface layer where the constituent composition will vary due to the effect of a heat treatment and the like, i.e. the carbon content of the raw material, is less than 0.1 mass %, a heat treatment such as carburizing must be carried out for a long period of time in order to obtain the surface hardness required to ensure sufficient rolling contact fatigue life. The heat treatment process will become complicated and the time required for heat treatment will become longer. As a result, the manufacturing cost for a rolling-contact shaft with a joint claw will be increased. With regards to steel having a carbon content of less than 0.1 mass %, steel added with Cr or the like that is effective in improving the rolling contact fatigue life is not common, and not readily available. If the carbon content of the raw material exceeds 1.2 mass %, a large iron carbide (at least 10 μm in size) will be readily generated in the steel. It is difficult to eliminate such a large iron carbide by the heat treatment applied during the manufacturing step of a rolling-contact shaft with a joint claw. Such an iron carbide will degrade the rolling contact fatigue life at the raceway and also reduce the torsional strength at the joint claw.

Although Cr is an alloy element effective for improving the rolling contact fatigue life, an amount less than 0.2 mass % will exhibit substantially no effect. In contrast, if the amount exceeds 2.0 mass %, many chromium carbides will be generated in the steel to degrade the torsional strength of the joint claw.

Accordingly, by setting the carbon content and chromium content at the region other than the surface layer, i.e., the carbon content and chromium content of steel qualified as the raw material of the rolling-contact shaft with a joint claw, in the range set forth above, the rolling contact fatigue life at the raceway and also the torsional strength at the joint claw can be improved.

Preferably in the rolling-contact shaft with the joint claw set forth above, the steel qualified as the raw material of the rolling-contact shaft includes at least 0.15 mass % and at most 1.1 mass % of carbon, at least 0.15 mass % and at most 0.7 mass % of silicon, at least 0.1 mass % and at most 1.15 mass % of manganese, and at least 0.4 mass % and at most 1.6 mass % of chromium, with the remainder consisting of iron and inevitable impurities.

In the rolling-contact shaft with a joint claw set forth above, the steel that is the raw material thereof may include, in addition to the composition set forth above, at most 0.3 mass % of molybdenum, with the remainder consisting of iron and inevitable impurities.

In the rolling-contact shaft with the joint claw set forth above, the surface hardness of the joint claw is preferably at least 520 HV and at most 720 HV. The inventors of the present invention studied in detail the relationship between the static fracture strength (torsional strength) of the joint claw and the surface hardness of the joint claw. It was found that, if the surface hardness of the joint claw is less than 520 HV, plastic flow or plastic deformation will occur at the joint claw when torsional load is applied, negating the feature as a joint claw, and if the surface hardness exceeds 720 HV, the joint claw is embrittled and the torsional strength degraded. It was also found that the torsional strength at the joint claw is particularly increased in the range of at least 540 HV and not more than 700 HV. In other words, if the surface hardness at the raceway of the rolling-contact shaft with a joint claw is set to a favorable hardness, for example set to 730 HV or above from the standpoint of improving the rolling contact fatigue life, the most favorable structure cannot be obtained when the surface hardness of the joint claw is set to the same level. It was found that a surface hardness lower than that of the raceway is preferable for the joint claw. Thus, by setting the surface hardness of the joint claw to at least 520 HV and at most 720 HV, the static fracture strength (torsional strength) of the joint claw can be improved. Particularly, in the case where the rolling-contact shaft with a joint claw is employed in an environment where the requirement level on the static fracture strength (torsional strength) of the joint claw is high, the surface hardness at the joint claw is preferably set to at least 540 HV and at most 700 HV.

In the rolling-contact shaft with the joint claw set forth above, the region including the raceway may be subjected to quench-hardening by means of induction heating after the joint claw is subjected to tempering by means of induction heating. In other words, the region including the raceway may be subjected to, for example, induction hardening.

This means that, in the case where the surface hardness of the raceway will be degraded during tempering by the induction heating carried out on the joint claw due to the specific configuration of the rolling-contact shaft with a joint claw such as the close location between the joint claw and the raceway, the surface hardness at the raceway can be increased again, allowing the rolling contact fatigue life of the raceway to be further improved.

Thus, a rolling-contact shaft with a joint claw improved in both the rolling contact fatigue life at the raceway and the static fracture strength (torsional strength) at the claw can be provided in accordance with the present invention.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
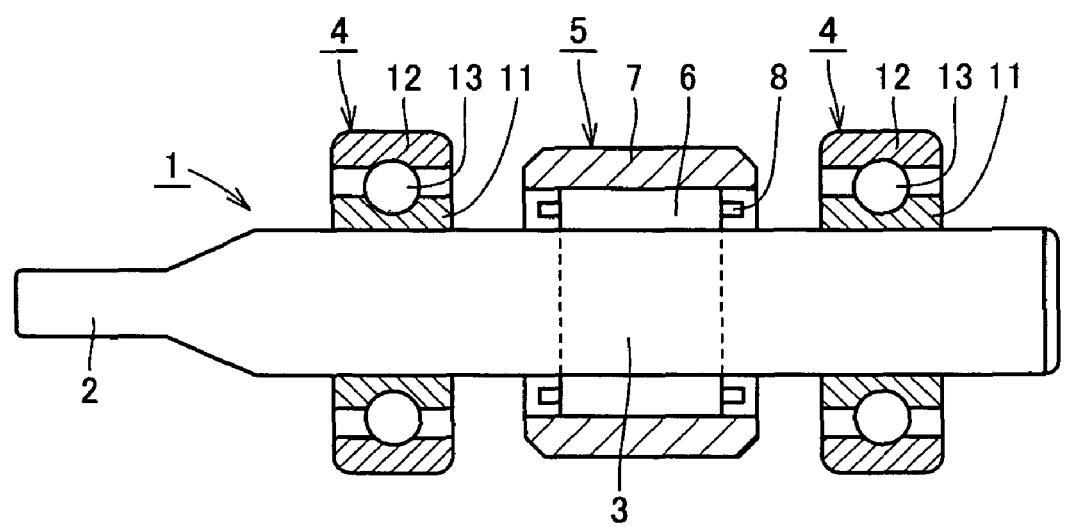
FIG. 1 is a schematic sectional view of a rolling-contact shaft with a joint claw, representing a configuration and a used state, according to an embodiment of the present invention.

Embodiments of the present invention will be described hereinafter with reference to the drawings. The same or corresponding elements in the drawings have the same reference character allotted, and description thereof will not be repeated.

First, a configuration of a rolling-contact shaft with a joint claw according to an embodiment of the present invention will be described hereinafter with reference to FIGS. 1 and 2.

Referring to FIG. 1, a rolling-contact shaft 1 with a joint claw of the present embodiment has a joint claw 2 formed at one end, and is supported by two ball bearings 4, 4 and a needle roller bearing 5 disposed between the two ball bearings 4 and 4. Ball bearing 4 includes an annular inner ring 11, an annular outer ring 12, and a plurality of balls 13 as rolling elements arranged in contact with the outer cylindrical surface of inner ring 11 and the inner cylindrical surface of outer ring 12. Rolling-contact shaft 1 with a joint claw and ball bearings 4 are formed such that the inner cylindrical surface of inner ring 11 is fitted with rolling-contact shaft 1. Needle roller bearing 5 includes an annular outer ring 7, a plurality of needle rollers 6 as rolling elements arranged in contact with the inner cylindrical surface of outer ring 7, and an annular cage 8. Outer ring 7 is arranged so as to surround a portion of the outer cylindrical surface of rolling-contact shaft 1. The plurality of needle rollers 6 are arranged so as to come into contact with a portion of the inner cylindrical surface of outer ring 7 and the outer cylindrical surface of rolling-contact shaft 1. The plurality of needle rollers 6 are disposed at a predetermined pitch in the circumferential direction by cage 8 and supported rotatably. At the outer cylindrical surface of rolling-contact shaft 1, the region where needle rollers 6 roll corresponds to a raceway 3 of rolling-contact shaft 1. By the above-described configuration, rolling-contact shaft 1 with a joint claw is relatively rotatable with respect to outer ring 12 of ball bearings 4 and 4 and outer ring 7 of needle roller bearing 5.

Figure 2:
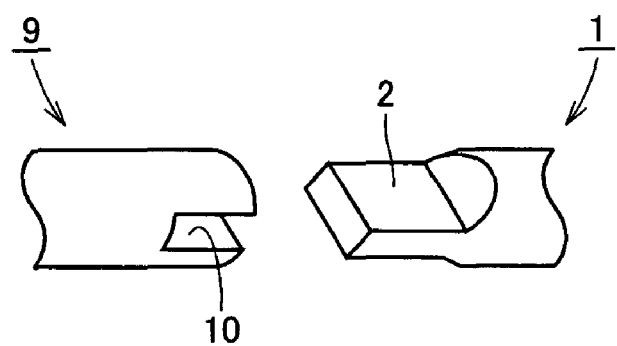
FIG. 2 is a diagram to describe in detail the neighborhood of the joint claw.

Referring to FIG. 2, joint claw 2 is the portion connected with another shaft 9, for example, to transmit the momentum such as turning to the adjacent shaft 9. Joint claw 2 is the flat-shaped portion formed at one end of rolling-contact shaft 1, and is fitted into a slit 10 formed at an end of another shaft 9, whereby connecting between rolling-contact shaft 1 and another shaft 9 is established. The configuration of joint claw 2 can be selected from a plurality of shapes, and may have the aforementioned flat shape with a notch at one end, or have a square sectional shape at the cross section perpendicular to the axial direction.

Referring to FIGS. 1 and 2, steel-made rolling-contact shaft 1 of the present embodiment includes a joint claw 2 at one end, and has a portion of the outer cylindrical surface functioning as raceway 3 of needle roller 6 identified as the rolling element of needle roller bearing 5. Joint claw 2 is subjected to tempering by means of induction heating. A nitrogen-enriched layer is formed at the surface layer. The grain size number of the austenite grains in the nitrogen-enriched layer exceeds number 10. Further, the hydrogen content is not more than 0.5 ppm.

Rolling-contact shaft 1 with a joint claw of the present embodiment is improved in tolerance with respect to metal fatigue since a nitrogen-enriched layer is formed at the surface layer. Further, the metal structure is rendered fine since the austenite grains are smaller, and embrittlement of the metal structure is obviated since the hydrogen content is reduced. Accordingly, the rolling contact fatigue life at raceway 3 is improved. At joint claw 2, the metal structure is rendered fine by virtue of the smaller austenite grains, and embrittlement of the metal structure is avoided by virtue of the lower hydrogen content. The tempering process by means of induction heating allows joint claw 2 to be subjected to tempering while suppressing influence on hardness at raceway 3. Accordingly, toughness at joint claw 2 can be ensured to improve the torsional strength while maintaining a long rolling contact fatigue life at raceway 3. As a result, rolling-contact shaft 1 with a joint claw of the present embodiment has both the rolling contact fatigue life of raceway 3 and the static fracture strength of joint claw 2 improved.

In rolling-contact shaft 1 with a joint claw of the present embodiment, the amount of retained austenite in at least the portion of the nitrogen-enriched layer where the surface functions as a raceway is preferably at least 11 volume % and at most 25 volume %. Accordingly, the rolling contact fatigue life with respect to a surface-origin fracture at raceway 3 is improved, and the secular dimension distortion of rolling-contact shaft 1 with a joint claw can be reduced.

In rolling-contact shaft 1 with a joint claw, the amount of retained austenite in the nitrogen-enriched layer at a region of 50 μm in depth from the surface functioning as a raceway may be set to at least 11 volume % and at most 25 volume %. As mentioned before, the retained austenite exhibits a significant effect on the rolling contact fatigue life with respect to a surface-origin fracture caused by damage at the raceway (surface) of the rolling-contact shaft with a joint claw. To provide this effect, the amount of retained austenite at the region in the vicinity of 50 μm in depth from the surface, having a great influence on the rolling contact fatigue life with respect to particularly a surface-origin fracture, becomes a critical factor. By setting the amount of retained austenite in the nitrogen-enriched layer at the region of 50 μm in depth from the surface to at least 11 volume % and at most 25 volume %, the rolling contact fatigue life with respect to a surface-origin fracture at the rolling-contact shaft with a joint claw can be improved.

In rolling-contact shaft 1 with a joint claw set forth above, the nitrogen content in the nitrogen-enriched layer is preferably at least 0.1 mass % and at most 0.7 mass %. Accordingly, the rolling contact fatigue life, particularly the rolling contact fatigue life with respect to a surface-origin fracture, can be improved.

In rolling-contact shaft 1 with a joint claw set forth above, the nitrogen content in the nitrogen-enriched layer at the region of 50 μm in depth from the surface may be set to at least 0.1 mass % and at most 0.7 mass %. Accordingly, the rolling contact fatigue life, particularly the rolling contact fatigue life with respect to a surface-origin fracture at rolling-contact shaft 1, can be improved.

In rolling-contact shaft 1 with a joint claw, the steel constituting rolling-contact shaft 1 preferably includes at least 0.1 mass % and at most 1.2 mass % of carbon, and at least 0.2 mass % and at most 2.0 mass % of chromium at a region other than the surface layer. Steel that satisfies these conditions includes, for example, a high carbon chromium bearing steel (SUJ2, SUJ3, or the like), and chromium molybdenum steel (SCM 420 or the like). Accordingly, the rolling contact fatigue life at the raceway as well as the torsional strength at the joint claw can be improved.

In rolling-contact shaft 1 with a joint claw, the surface hardness at joint claw 2 is at least 520 HV and at most 720 HV. Accordingly, the static fracture strength (torsional strength) of joint claw 2 can be improved.

Following application of tempering by induction heating on joint claw 2 in rolling-contact shaft 1, the region including raceway 3 can be subjected to quench-hardening by means of induction heating. In other words, induction hardening may be applied on the region including raceway 3.

Even in the case where the surface hardness at raceway 3 is degraded during tempering by means of induction heating on joint claw 2, the surface hardness at raceway 3 can be increased again, allowing the rolling contact fatigue life of raceway 3 to be improved.

Referring to FIGS. 1 and 2, ball bearing 4 is, for example, a deep groove ball bearing. Outer ring 12 is fixed by being fitted into a portion of the inner wall of a housing not shown. Outer ring 7 of needle roller bearing 5 may be of the type employed as a roller, or fixed to a housing or the like not shown. Raceway 3 may be provided at a region concentric with and having the same diameter as other portions, at the outer cylindrical surface of rolling-contact shaft 1, or at a portion where the axis differs and deviates. Raceway 3 may be provided at one or a plurality of sites at the outer cylindrical surface of rolling-contact shaft 1. The width of raceway 3 in the axial direction is set to be preferably at least 5%, further preferably at least 10%, larger than the length of needle roller 8. Accordingly, the rolling contact fatigue life of raceway 3 is further stabilized.

A manufacturing method of a rolling-contact shaft with a joint claw of the present embodiment will be described hereinafter with reference to FIGS. 3 and 4.

Figure 3:
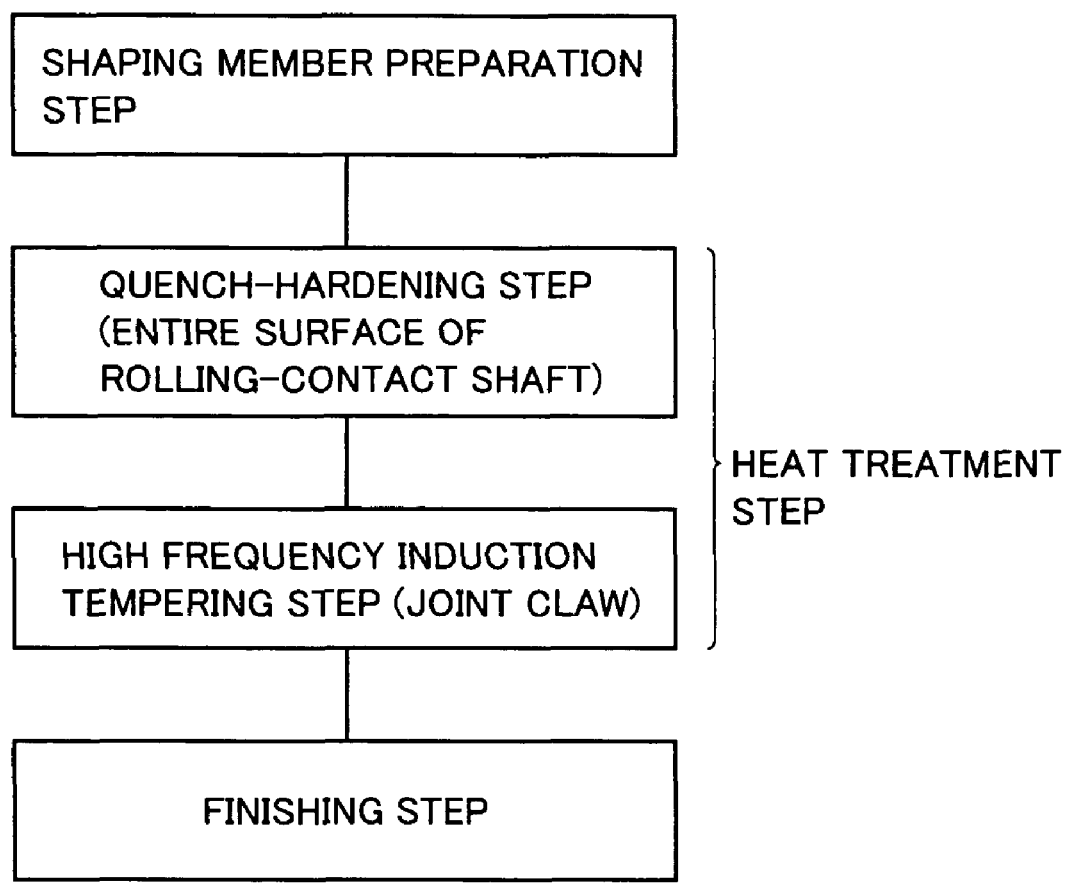
FIG. 3 schematically represents a manufacturing method of a rolling-contact shaft with the joint claw according to an embodiment.

Referring to FIG. 3, a shaping member preparation step of preparing a member shaped into the configuration of a rolling-contact shaft with a joint claw is carried out. Specifically, processes such as forging, turning, or the like are applied on the raw material, for example, on a steel bar, or the like. Thus, a member shaped to the configuration of rolling-contact shaft 1 with a joint claw shown in FIG. 1 is prepared.

Then, a quench-hardening step is carried out to harden the rolling-contact shaft with a joint claw. Specifically, rolling-contact shaft 1 with a joint claw of FIG. 1 prepared as a shaped member in the shaping member preparation step is subjected to quench-hardening. At this stage, a carbonitriding process is applied to form a nitrogen-enriched layer at the surface layer of rolling-contact shaft 1 with a joint claw. Then, a high frequency induction tempering step of FIG. 3 is carried out by means of high frequency induction heating to temper joint claw 2 of rolling-contact shaft 1 that has been subjected to quench-hardening. The heat treatment step including this quench-hardening step and high frequency induction tempering step will be described in detail afterwards.

Then, the finishing step of FIG. 3 is carried out. Specifically, rolling-contact shaft 1 with a joint claw of FIG. 1 subjected to quench-hardening and tempering is subjected to a finishing process such as grinding.

Figure 4:
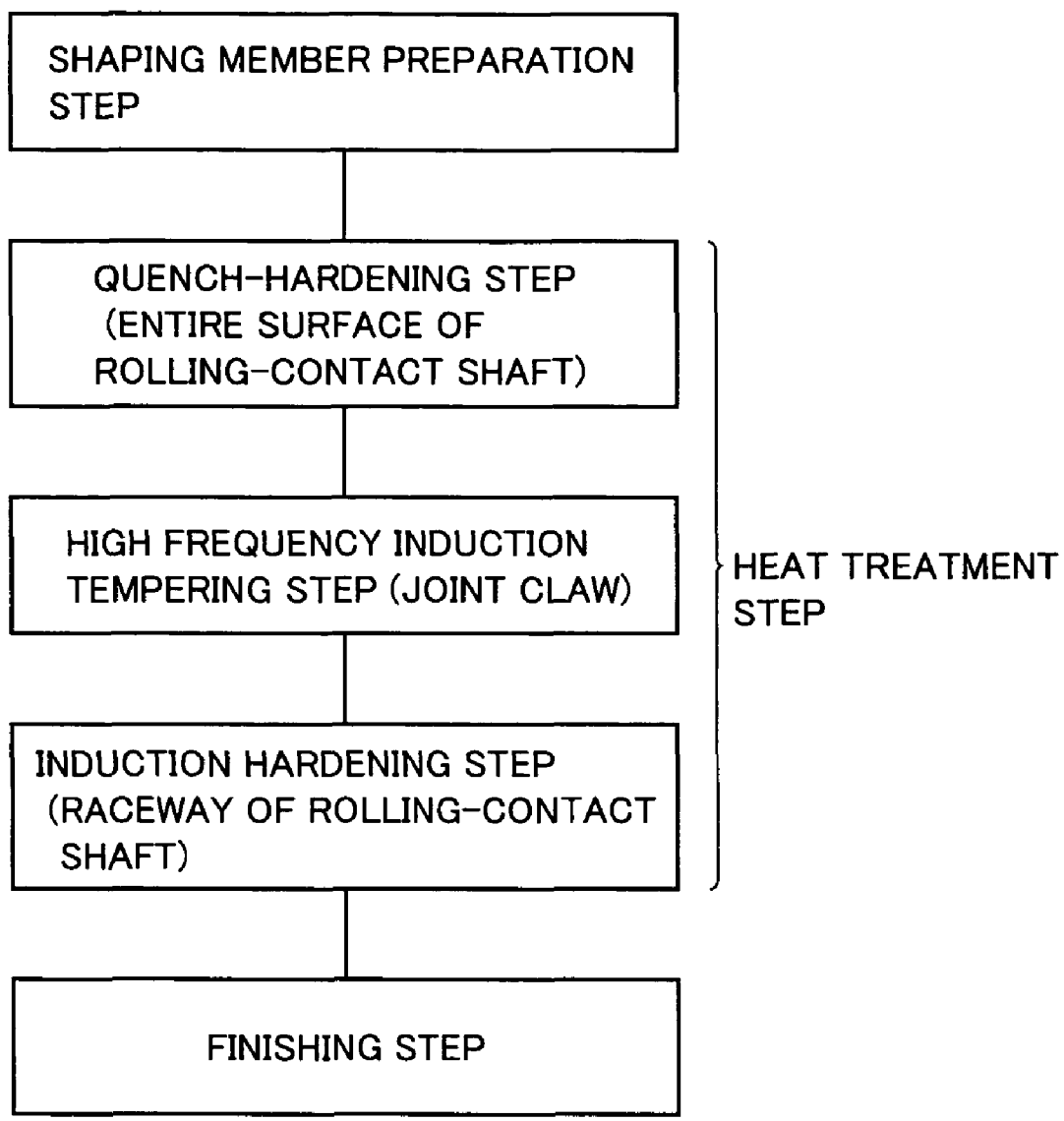
FIG. 4 schematically represents a modification of a manufacturing method of a rolling-contact shaft with a joint claw according to an embodiment.

A modification of the manufacturing method of a rolling-contact shaft with a joint claw of the present embodiment shown in FIG. 4 is basically similar to the previous manufacturing method described based on FIG. 3. The present modification differs from the manufacturing method of FIG. 3 in that an induction hardening step of quench-hardening the raceway of the rolling-contact shaft with a joint claw is carried out between the high frequency induction tempering step and the finishing step. Specifically, following the tempering on joint claw 2 by high frequency heating in the high frequency induction tempering step, the region including raceway 3 is quench-hardened by means of high frequency induction heating in the induction hardening step.

Accordingly, the surface hardness of raceway 3 can be increased again even if the surface hardness of raceway 3 is degraded during the tempering step by high frequency induction heating applied on joint claw 2. Thus, the rolling contact fatigue life of raceway 3 can be improved.

Figure 5:
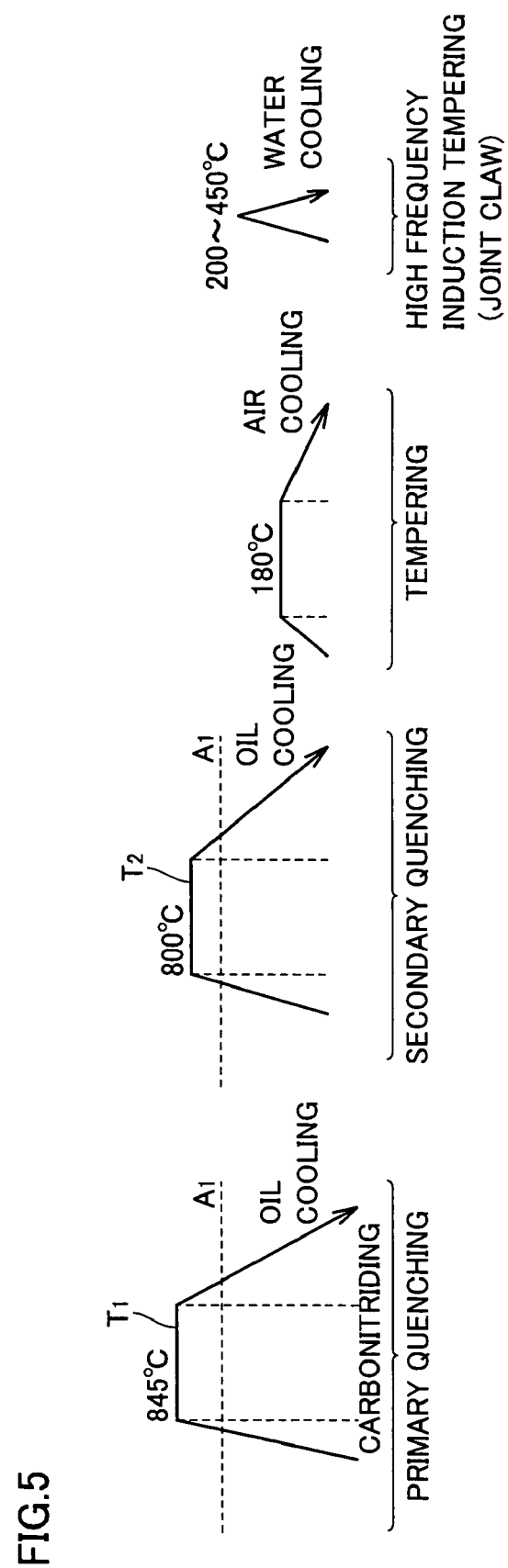
FIG. 5 is a diagram to describe in detail a heat treatment step in a manufacturing method of a rolling-contact shaft with a joint claw of the present embodiment.

The heat treatment step applied on a rolling-contact shaft with a joint claw of the present embodiment will be described in detail hereinafter with reference to FIG. 5. In FIG. 5, the horizontal direction corresponds to time with the elapse in the rightward direction, whereas the vertical direction corresponds to temperature, representing a higher temperature as a function of height.

Referring to FIG. 5, rolling-contact shaft 1 with a joint claw prepared as the shaped member in the shaping member preparation step is heated to a temperature $T_1$ of at least 800° C. and at most 900° C., for example, 845° C., that is equal to or higher than an $A_1$ point temperature, and retained for a period of time of at least 60 minutes and at most 240 minutes, for example, for 150 minutes. By the heating process carried out in an atmosphere in which ammonia ($NH_3$) is added to RX gas at this stage, the carbon concentration and nitrogen concentration at the surface layer of rolling-contact shaft 1 can be adjusted to the desired level. Then, rolling-contact shaft 1 with a joint claw is dipped in, for example, oil (oil cooling) to be cooled down to a temperature of $M_s$ point or below from the temperature of at least $A_1$ point. Thus, primary quenching is completed.

Then, rolling-contact shaft 1 with a joint claw subjected to primary quenching is heated again to a temperature $T_2$ of at least 780° C. and at most 820° C., for example, to 800° C., that is equal to or higher than $A_1$ point temperature, and retained for a period of time of at least 30 minutes and at most 120 minutes, for example, 90 minutes. At this stage, heating is conducted in an atmosphere including RX gas, for example, to prevent decarbonizing, for example, such that the carbon concentration and nitrogen concentration adjusted in the carbonitriding process attain the desired level. Then, rolling-contact shaft 1 with a joint claw is subjected to oil cooling, for example, to be cooled rapidly to a temperature of $M_s$ point or below from the temperature of at least $A_1$ point for quench-hardening. Thus, secondary quenching is completed.

Rolling-contact shaft 1 with a joint claw subjected to secondary quenching is further heated to a temperature of at least 160° C. and at most 200° C., for example, to 180° C., corresponding to the temperature of $A_1$ point or below, and retained for at least 60 minutes and at most 240 minutes, for example, for 120 minutes, followed by cooling. Thus, tempering is completed. At this stage, the surface hardness of rolling-contact shaft 1 with a joint claw is preferably at least 60 HRC (697 HV).

Rolling-contact shaft 1 with a joint claw subjected to secondary quenching and tempering has joint claw 2 further heated to a temperature of at least 200° C. and at most 450° C. by high frequency induction heating, retained for at most 30 seconds, and then sprayed with water for cooling (water cooling). Thus, the high frequency induction tempering of joint claw 2 is completed. At this stage, in order to avoid the influence of high frequency induction tempering on rolling-contact shaft 1 at a region other than joint claw 2, particularly on raceway 3 through heat conduction, the period of time joint claw 2 is heated and retained is preferably short. For example, this period of time is set to 5 seconds or below, and preferably cooled rapidly by water cooling or the like. By the procedures set for above, the heat treatment step in the fabrication method of rolling-contact shaft 1 with a joint claw of the present embodiment is completed.

Temperatures $T_1$ and $T_2$ are preferably set in the range of 800° C. to 850° C. and the range of 780° C. to 820° C., respectively, as noted above, from the standpoint of reducing the concentration of hydrogen entering steel. Further, temperature $T_2$ is preferably set lower than temperature $T_1$ from the standpoint of reducing the size of austenite grains.

$A_1$ point corresponds to the temperature of the steel structure beginning its transformation to austenite from ferrite when steel is heated. $M_s$ point corresponds to the temperature of the austenized steel beginning its transformation into martensite when the austenized steel is cooled.

Figure 6:
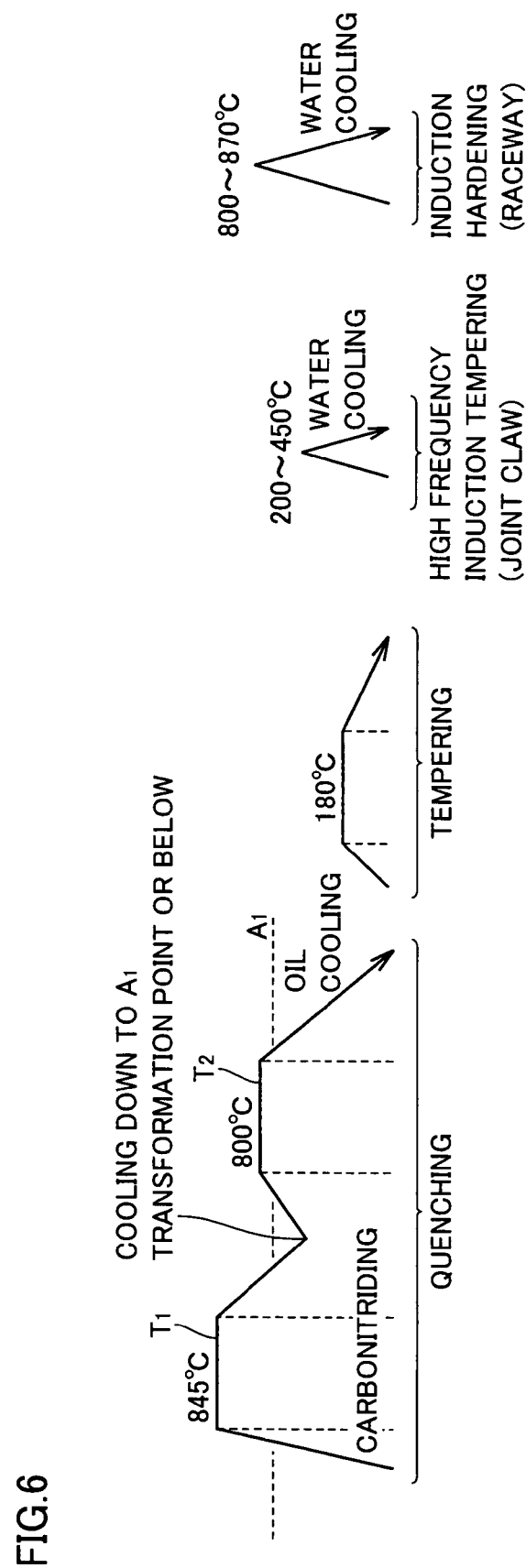
FIG. 6 is a modification of a heat treatment step in a manufacturing method of a rolling-contact shaft with a joint claw according to an embodiment.

A modification of the heat treatment step in the manufacturing method of a rolling-contact shaft with a joint claw of the present embodiment will be described hereinafter with reference to FIG. 6. In FIG. 6, the horizontal direction corresponds to time with the lapse in the rightward direction, whereas the vertical direction corresponds to temperature, representing a higher temperature as a function of height.

The heat treatment step of FIG. 6 in accordance with the present modification and the heat treatment step of FIG. 5 set forth above are basically similar including the temperature conditions. The difference lies in that the heat treatment step of FIG. 6 does not complete primary quenching by oil cooling after the carbonitriding process. First, following cooling down to the temperature of $A_1$ transformation point or below, heating is applied again up to temperature $T_2$ that is equal to or higher than $A_1$ transformation point without cooling down to room temperature (ambient temperature).

Accordingly, the time and energy required for heating up to temperature $T_2$ can be reduced as compared to the case where heating up to temperature $T_2$ is carried out after quenching is effected once. This is advantageous in that the manufacturing cost can be reduced. The temperature level to cool down after carbonitriding is arbitrary as long as it is lower than $A_1$ transformation point, and can be set to at least 600° C. and at most 700° C., for example.

The heat treatment step of FIG. 6 differs from that of FIG. 5 also in that an induction hardening step is carried out after the high frequency induction tempering step. Specifically, following the high frequency induction tempering on joint claw 2, the region of the rolling-contact shaft including raceway 3 and not including joint claw 2 is heated to the temperature of at least 800° C. and at most 870° C. and retained for a period of 10 seconds or less. Then, water cooling is applied. At this stage, in order to avoid the influence of induction hardening on rolling-contact shaft 1 in the neighborhood of joint claw 2 through heat conduction, the period of time joint claw 2 is heated and retained is preferably short. For example, this period of time is set to 2 seconds or less, and water cooling or the like is effected preferably by rapid cooling. Further, for the purpose of improving the toughness of the region subjected to quenching, a tempering step is executed, including heating at least the region subjected to quenching to a temperature of $A_1$ point or below and then cooling, subsequent to the induction hardening step. The heating in this tempering step may be carried out by induction heating.

Accordingly, in the case where the surface hardness of raceway 3 will be degraded during tempering by the induction heating carried out on joint claw 2 due to the specific configuration of rolling-contact shaft 1 with a joint claw such as the close location between joint claw 2 and raceway 3, the surface hardness at raceway 3 can be increased again, allowing the rolling contact fatigue life of the raceway to be further improved.

In the heat treatment step set forth above, rolling-contact shaft 1 with a joint claw has a nitrogen-enriched layer formed at the surface layer. The grain size number of austenite grains in the nitrogen-enriched layer can be set to exceed number 10, and the hydrogen content of rolling-contact shaft 1 with a joint claw can be set to at most 0.5 ppm. Further, the amount of retained austenite at a portion of the nitrogen-enriched layer where the surface functions as a raceway, particularly at the region of 50 μm in depth from the surface, can be set to at least 11 volume % and at most 25 volume %. The nitrogen content at a region of the nitrogen-enriched layer, particularly the region of 50 μm in depth from the surface, can be set to at least 0.1 mass % and at most 0.7 mass %. Joint claw 2 is subjected to tempering by induction heating, and the surface hardness of joint claw 2 can be set to at least 520 HV and at most 720 HV. Further, by employing steel containing at least 0.1 mass % and at most 1.2 mass % of carbon, and at least 0.2 mass % and at most 2.0 mass % of chromium as the raw material of rolling-contact shaft 1 with a joint claw, the steel constituting rolling-contact shaft 1 with a joint claw includes at least 0.1 mass % and at most 1.2 mass % of carbon and at least 0.2 mass % and at most 2.0 mass % of chromium at the region other than the surface layer.

Figure 7:
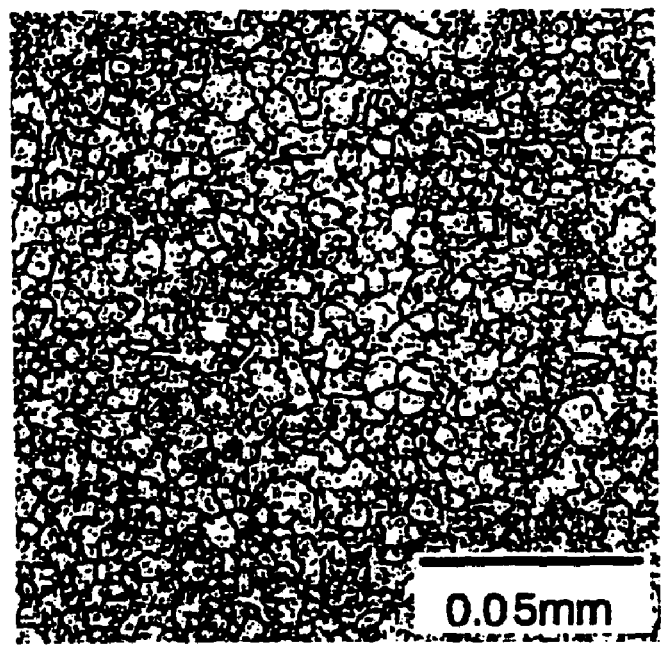
FIG. 7 represents the microstructure of a nitrogen-enriched layer, particularly austenite grain, formed at the surface layer of a rolling-contact shaft with a joint claw of an embodiment.
Figure 8:
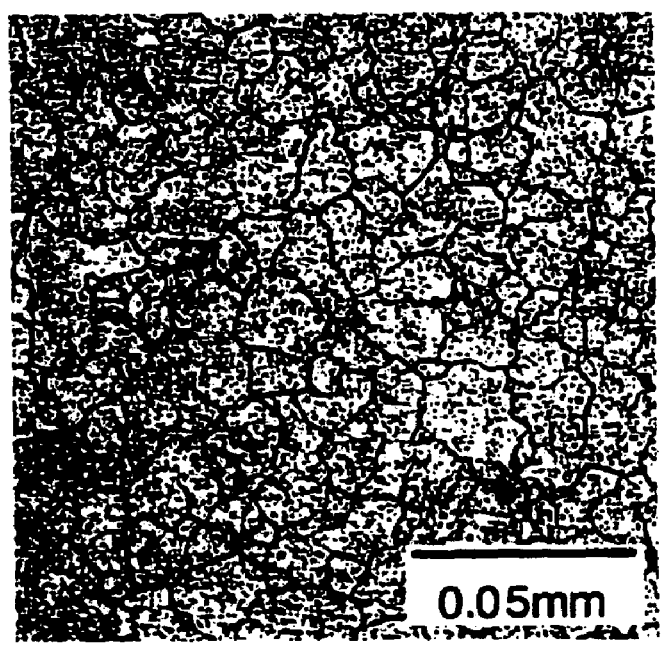
FIG. 8 represents the microstructure at the surface layer, particularly austenite grain, in a conventional rolling-contact shaft with a joint claw.
Figure 9:
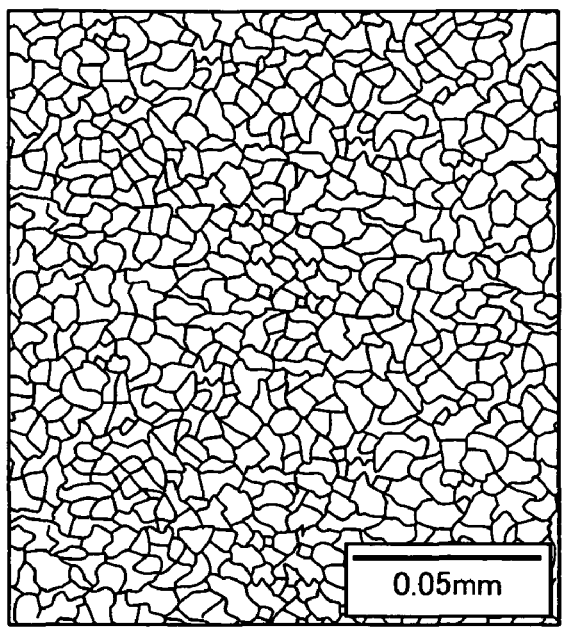
FIG. 9 schematically represents the austenite grains of FIG. 7.
Figure 10:
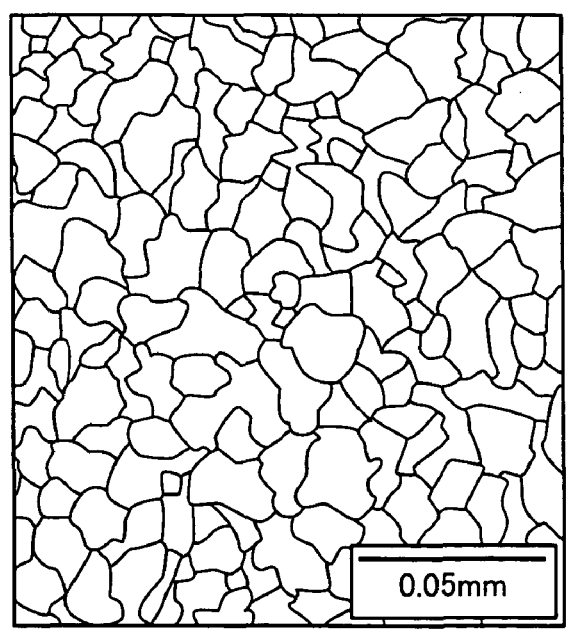
FIG. 10 schematically represents the austenite grains of FIG. 8.

Austenite grains in the nitrogen-enriched layer formed at the surface layer of the rolling-contact shaft with a joint claw of the present embodiment will be described hereinafter with reference to FIGS. 7-10. FIG. 7 corresponds to the case where bearing steel (SUJ2 of the JIS) is employed as the raw material and the heat treatment step of FIG. 5 is employed. FIG. 8 corresponds to the case where bearing steel (SUJ2 of the JIS) is employed as the raw material, and a bright heat treatment that is the conventional heat treatment is employed for the heat treatment step.

Referring to FIGS. 7-10, the grain size number of austenite grains at the surface layer of a conventional rolling-contact shaft with a joint claw is number 10, whereas the grain size number of austenite grains in the nitrogen-enriched layer formed at the surface layer of the rolling-contact shaft with a joint claw of the present embodiment is number 12. The average grain size of the austenite grains in FIG. 7 was 5.6 μm as a result of measurement by the intercept method.

In the rolling-contact shaft with a joint claw subjected to a quench-hardening step including carbonitriding set forth above, the surface layer has improved tolerance with respect to metal fatigue since a nitrogen-enriched layer is formed. Further, the metal structure is rendered fine since smaller austenite grains are achieved, and embrittlement in the metal structure is obviated since the hydrogen content is reduced. Therefore, the rolling contact fatigue life at raceway 3 is improved, which in turn improves the rolling contact fatigue life of rolling-contact shaft 1 with a joint claw. It is to be noted that the raw material steel includes Cr and the like as the alloy component, and the carbon concentration and nitrogen concentration at the surface layer are high. Therefore, if a rolling-contact shaft with a joint claw is simply manufactured, the torsional strength of joint claw 2 is not necessarily high. For example, in the case where medium carbon steel for machine structural use (such as S53C of the JIS) is employed for the raw material and the rolling-contact shaft with a joint claw has the raceway subjected to induction hardening as in the conventional case, the torsional strength at the joint claw of the rolling-contact shaft subjected to the quench-hardening step set forth above may be degraded. In contrast, rolling-contact shaft 1 with a joint claw of the present embodiment has the toughness increased and the torsional strength improved at joint claw 2 since the high frequency induction tempering set forth above is applied on joint claw 2. Accordingly, the two opposing requirements of improving the rolling contact fatigue life at raceway 3 and improving the torsional strength at joint claw 2 can both be met.

Example 1

Example 1 of the present invention will be described hereinafter. Using SUJ2 material of the JIS as the raw material (1.0 mass % of C, 0.25 mass % of Si, 0.4 mass % of Mn, 1.5 mass % of Cr), tests to investigate the influence of the heat treatment history in the heat treatment step on various properties of a rolling-contact shaft with a joint claw were conducted. The investigated properties were: (1) hydrogen content, (2) austenite grain size, (3) Charpy impact value, (4) fracture stress value, and (5) rolling contact fatigue life.

Eight specimens labeled as Specimens A-H were employed for the test. The heat treatment history of each specimen is as set forth below. Specimens A-D (examples of present invention) were carbonitrided by being retained for 150 minutes at the temperature of 850° C. in a mixture gas atmosphere of RX gas and ammonia ($NH_3$) gas. The heat treatment pattern employed was similar to the heat treatment step of FIG. 5, provided that high frequency induction tempering was not carried out. Following primary quenching from the temperature of 850° C. that is the temperature level of the carbonitriding process, the specimens were heated to 780° C.-830° C. that is lower in range than the carbonitriding process temperature. Then, secondary quenching was effected by rapid cooling. Specimen A corresponding to the secondary quenching temperature of 780° C. was not quench-hardened sufficiently, and was excluded from the testing subject in investing the properties.

Specimens E and F (comparative examples) were subjected to a heat treatment basically similar to that of Specimens A-D, provided that the secondary quenching temperature was set to 850° C. to 870° C. that is equal to or higher than the carbonitriding temperature of 850° C. Specimen G (comparative example corresponding to conventional carbonitriding process) was carbonitrided by being retained for 150 minutes at the temperature of 850° C. in a mixture gas atmosphere of RX gas and ammonia gas. Then, Specimen G was rapidly cooled from the carbonitriding process temperature of 850° C., and was not subjected to secondary quenching. Specimen H (comparative example corresponding to general quenching) was not carbonitrided, and quenching was applied by rapid cooling subsequent to heating at 850° C. Specimen H was not subjected to secondary quenching.

The testing methods to investigate each property are set forth below.

(1) Hydrogen Content

The hydrogen content was obtained by analyzing the non-diffusible hydrogen content in steel using the DH-103 type hydrogen analyzer of LECO Corporation. The diffusible hydrogen content was not measured. The specification of the LECO DH-103 hydrogen analyzer is as follows. Analyzing range: 0.01-50.00 mass ppm; analyzing accuracy: ±0.1 mass ppm or ±3 mass % H (whichever is larger); analyzing sensitivity: 0.01 mass ppm; analyzing method: heat conductivity method. The specimen weight range was 10 mg to 35 mg (specimen size: 12 mm in diameter×100 mm in length at the maximum), and the temperature range of the heating furnace was 50° C.-1100° C. Anhydron ($Mg(ClO_4)_2$) and Ascarite (NaOH) were employed as reagents. Nitrogen gas was employed for carrier gas, and hydrogen gas was used for gas dosing gas. All the gases had the purity of at least 99.99 mass %, and pressure of 40 psi (2.8 kgf/cm$^2$).

The measurement procedure is schematically set forth below. Each specimen collected by a dedicated sampler was inserted into the above-described hydrogen analyzer, one sampler at a time. The diffusible hydrogen inside was guided into a heat conductivity detector by the nitrogen carrier gas. This diffusible hydrogen was not measured in the present example. Then, the specimen was taken out from the sampler, heated in a resistance heating furnace, and the non-diffusible hydrogen was guided into a heat conductivity detector by nitrogen carrier gas. By measuring the heat conductivity through the heat conductivity detector, the non-diffusible hydrogen content can be identified.

(2) Austenite Grain Size

The grain size of the austenite grains were measured based on an austenite grain size test method on steel of JIS G 0551.

(3) Charpy Impact Value

Measurements of Charpy impact values were obtained based on the Charpy impact test method on the metal material of JIS Z 2242. The employed test pieces were the U notch test piece indicated at JIS Z 2202 (No. 3 test piece of the JIS).

(4) Fracture Stress Value

The testing method of a static compressive fracture test for measurement of fracture stress values will be described hereinafter.

Figure 11:
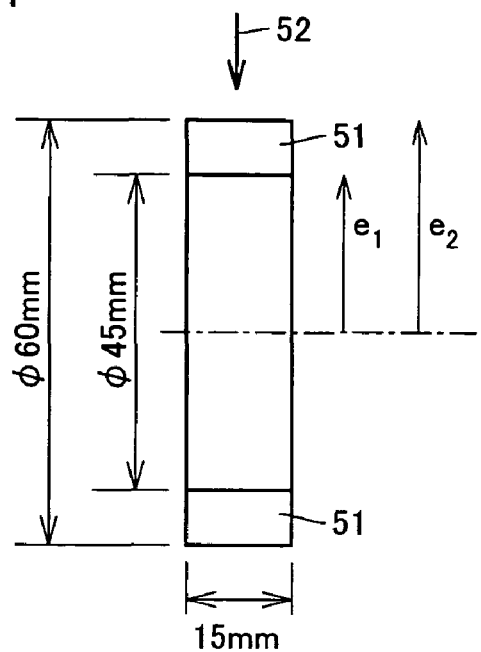
FIG. 11 shows a specimen in a static compressive fracture strength test to measure the fracture stress values.

Referring to FIG. 11, a test piece 51 for the static compressive fracture test had an annular configuration of 60 mm in outer diameter, 45 mm in inner diameter, and 15 mm in width. Load was gradually applied in a load direction 52 indicated by an arrow. The load at the time of fracture of test piece 51 was measured. The obtained fracture load was converted into a stress value by the following stress calculation equations (A)-(C) of a bent beam. Test piece 51 is not limited to that shown in FIG. 11, and may take another configuration.

The fiber stress at the convex surface ($\sigma_1$) and the fiber stress at the concave surface ($\sigma_2$) of the test piece in FIG. 11 were obtained by the following equations (refer to Mechanical Engineers Handbook, A4 Edition, Strength of Materials A4-40), where N is the axial force at the cross section including the axis of test piece 51, A is the transverse area, $e_1$ is the outer radius, $e_2$ is the inner radius (refer to FIG. 11), and κ is the section modulus of the bent beam.

$$\sigma_1 = (N/A) + \{M/(A\rho_0)\}[1 + e_1/\{\kappa(\rho_0 + e_1)\}] \quad (A)$$

$$\sigma_2 = (N/A) + \{M/(A\rho_0)\}[1 - e_2/\{\kappa(\rho_0 - e_2)\}] \quad (B)$$

$$\kappa = -(1/A)\int A\{\eta/(\rho_0 + \eta)\}dA \quad (C)$$

(5) Rolling Contact Fatigue Life

The heat treatment history applied on the test piece directed to rolling contact fatigue life was similar to that applied in the proximity of the raceway of the rolling-contact shaft with a joint claw. The rolling contact fatigue life test corresponds to the test of the rolling contact fatigue life at the raceway of the rolling-contact shaft with the joint claw. The test conditions for rolling contact fatigue life are shown in Table 1.

TABLE 1

| | |
|---|---|
| Test Piece | Cylindrical Test Piece φ12 mm × L22 mm |
| No. of Tests | 10 |
| Mating Steel Ball | ¾ in. (19.05 mm) |
| Contact Pressure | 5.88 GPa |
| Load Rate | 46240 cpm |
| Lubricant | Turbine VG68, lubricated by forced circulation |

As shown in Table 1, a cylindrical test piece having a diameter of 12 mm and a length of 22 mm was employed. The test piece had load applied 46240 times per minute while forming contact with steel balls of ¾ inches (19.05 mm) at the contact pressure of 5.88 GPa. The loaded times until flaking occurred at the test piece (life time) was identified. The obtained life time was statistically analyzed, and the life time ($L_{10}$ life) corresponding to a cumulative failure rate of 10% was calculated. The number of tests carried out for each specimen was 10 times. Turbine VG68 was employed as the lubricant. The specimens were lubricated by forced circulation.

Figure 12:
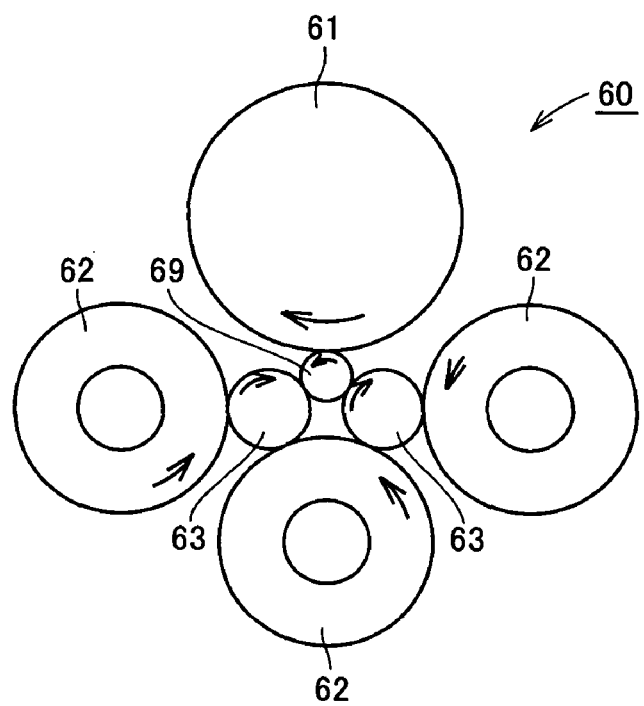
FIG. 12 is schematic front view of a rolling contact fatigue life test machine.
Figure 13:
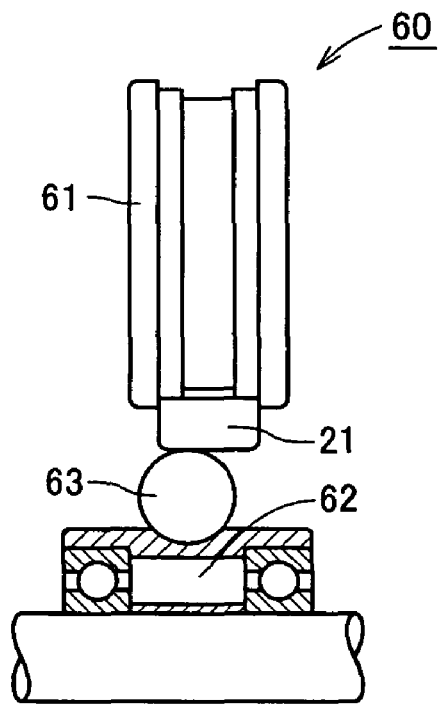
FIG. 13 is a schematic side view of a rolling contact fatigue life test machine.

The test machine of the rolling contact fatigue life test will be described hereinafter with reference to FIGS. 12 and 13.

A rolling contact fatigue life test machine 60 includes a driving roll 61, a guide roll 62, and steel balls 63. A test piece 69 for the rolling contact fatigue life test is driven by driving roll 61 to turn in contact with steel balls 63. Steel balls 63 were guided by guide roll 62 to roll with pressure against test piece 69.

The results of the tests will be described hereinafter. Table 2 represents the results of the above-described tests (1)-(5).

TABLE 2

| | Specimens | | | | | | | |
|---|---|---|---|---|---|---|---|---|
| | A | B | C | D | E | F | G | H |
| Secondary quenching temperature (° C.) | 780 | 800 | 815 | 830 | 850 | 870 | — | — |
| Hydrogen content (mass ppm) | — | 0.37 | 0.40 | 0.38 | 0.42 | 0.40 | 0.72 | 0.38 |
| Grain size (JIS grain size number) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |
| Fracture stress value (MPa) | — | 2840 | 2780 | 2650 | 2650 | 2700 | 2330 | 2770 |
| Rolling contact fatigue life Ratio: $L_{10}$ | — | 5.4 | 4.2 | 3.5 | 2.9 | 2.8 | 3.1 | 1 |

(1) Hydrogen Content

Referring to Table 2, Specimen G corresponding to a conventional carbonitriding process product not subjected to secondary quenching exhibits an extremely high value of 0.72 ppm. This probably because of the fact that ammonia ($NH_3$) included in the atmosphere of the carbonitriding process was decomposed to cause hydrogen to enter steel. In contrast, Specimens B-D exhibited the hydrogen content of 0.37-0.40 ppm, which is reduced substantially by half The hydrogen content is of a level similar to that of Specimen H corresponding to a general quenched product.

The reduction in the hydrogen content set forth above contributes to alleviating the embrittlement of steel caused by hydrogen dissolution. In other words, by reducing the hydrogen content, the Charpy impact value of Specimens B-D of the present example is greatly improved than that of Specimen G.

(2) Austenite Grain Size

Table 2 shows that the austenite grain size is reduced significantly, represented by grain size numbers 11-12, in the case where the temperature of secondary quenching is set lower than the temperature of quenching in the carbonitriding process (primary quenching) corresponding to Specimens B-D. In contrast, Specimens E and F with secondary quenching carried out at a temperature of at least the temperature of primary quenching, and Specimens G and F not subjected to secondary quenching, exhibited the austenite grain size of number 10, representing larger grains than those of Specimens B-D of the present example.

(3) Charpy Impact Value

It is appreciated from Table 2 that Specimen G corresponding to a conventional carbonitriding process product exhibited the Charpy impact value of 5.33 J/cm$^2$ whereas Specimens B-D of the present example exhibited a higher Charpy impact value of 6.30-6.65 J/cm$^2$. It is particularly noted that a specimen with a lower temperature for secondary quenching tends to exhibit a higher Charpy impact value. Specimen H corresponding to a conventional quenching product exhibited a high Charpy impact value of 6.70 J/cm$^2$.

(4) Fracture Stress Value

It is appreciated from Table 2 that Specimen G corresponding to a conventional carbonitriding process product exhibited a fracture stress value of 2330 MPa, whereas Specimen B-D exhibited improved values of 2650-2840 MPa. Specimen H corresponding to a general quenched product exhibited a fracture stress value of 2770 MPa. From the relationship of the fracture stress value with respect to the hydrogen content and austenite grain size, it is assumed that the improved static fracture strength of Specimen B-D is ascribed to the reduction of the hydrogen content as well as the smaller austenite grains.

(5) Rolling Contact Fatigue Life

Specimen H in Table 2 corresponding to a general quenching product is absent of a nitrogen-enriched layer at the surface layer. Therefore, specimen H has the shortest rolling contact fatigue life $L_{10}$. In contrast, Specimen G corresponding to a conventional carbonitriding process product exhibited a rolling contact fatigue life that is 3.1 times longer. Further, Specimens B-D subjected to secondary quenching at a temperature lower than the temperature of the carbonitriding process, among Specimens B-F, exhibited a rolling contact fatigue life significantly improved than that of Specimen G corresponding to a conventional carbonitriding process product. Specimens E and F subjected to secondary quenching at a temperature higher than the temperature of the carbonitriding process exhibited a rolling contact fatigue life equal to or lower than that of Specimen G corresponding to a conventional carbonitriding process product.

It is appreciated from the above-described test results that Specimens B-D of the present example corresponding to a rolling-contact shaft with a joint claw of the present invention exhibit an impact-resistant strength, static fracture strength, and a rolling contact fatigue life favorable than those of other specimens by virtue of formation of a nitrogen-enriched layer at the surface layer, the smaller grain size, and the lower hydrogen content.

Example 2

Example 2 of the present invention will be described hereinafter. Using SUJ2 material of the JIS as the raw material (1.0 mass % of C, 0.25 mass % of Si, 0.4 mass % of Mn, 1.5 mass % of Cr), tests to investigate the influence of the heat treatment history in the heat treatment step on various properties of a rolling-contact shaft with a joint claw were conducted. The investigated properties were: (1) rolling contact fatigue life, (2) Charpy impact value, (3) static fracture toughness value, (4) fracture stress value, (5) secular dimensional distortion rate, and (6) rolling contact fatigue life under contaminated lubricant environment.

Three specimens labeled as Member X, Member Y and Member Z were employed as the specimens for the test. The heat treatment history of each specimen is as set forth below. For Member X (comparative example: general quenching), carbonitriding was not carried out, and quenching was effected. Secondary quenching was not carried out. For Member Y (comparative example: conventional carbonitriding process), carbonitriding was effected by retaining the member for 150 minutes at the temperature of 845° C. in a mixture gas atmosphere of RX gas and ammonia gas. Then, rapid cooling was effected from the carbonitriding process temperature of 845° C. to effect quenching. Secondary quenching was not carried out. For Member Z (present example), carbonitriding was effected by retaining the member for 150 minutes at 845° C. in a mixture gas atmosphere of RX gas and ammonia gas. The heat treatment pattern corresponds to the heat treatment step of FIG. 5. Following primary quenching from the carbonitriding process temperature of 845° C., heating to 800° C. that is lower in temperature than that of carbonitriding was conducted. Then, rapid cooling was effected for secondary quenching.

The testing method and testing results will be described hereinafter.

(1) Rolling Contact Fatigue Life

Likewise Example 1, the rolling contact fatigue life test corresponds to a rolling contact fatigue life test on the raceway of a rolling-contact shaft with a joint claw. The test conditions and test machine are similar to those of Example 1. Results of the tests are shown in Table 3.

TABLE 3

| Member | Life (loaded times) | | Ratio of $L_{10}$ |
|---|---|---|---|
| | $L_{10}$ (×10⁴ times) | $L_{50}$ (×10⁴ times) | |
| Member X | 8017 | 18648 | 1.0 |
| Member Y | 24656 | 33974 | 3.1 |
| Member Z | 43244 | 69031 | 5.4 |

It is appreciated from Table 3 that Member Y (Comparative Example) subjected to carbonitriding and having a nitrogen-enriched layer formed exhibited an $L_{10}$ life (statistically, the life time until one among ten test pieces fractures) that is 3.1 times the $L_{10}$ life of Member X (Comparative Example) subjected to general quenching alone. The advantage of increasing the life time due to the formation of a nitrogen-enriched layer is recognized. Member Z corresponding to the present example exhibited a life 1.74 times longer that of Member Y and 5.4 times longer that of Member X. This increase in life time is due mainly to the fact of the fine steel structure (microstructure) caused by the smaller austenite grains in addition to the formation of a nitrogen-enriched layer.

(2) Charpy Impact Value

The testing method is similar to that of Example 1. The test results are shown in Table 4.

TABLE 4

| Member | Charpy Impact Value (J/cm²) | Ratio of Impact Value |
|---|---|---|
| Member X | 6.7 | 1.0 |
| Member Y | 5.3 | 0.8 |
| Member Z | 6.7 | 1.0 |

It is appreciated from Table 4 that Member Y (comparative example) subjected to the conventional carbonitriding process exhibited a Charpy impact value lower than that of Member X (comparative example) subjected to general quenching. Member Z (present example) exhibited a Charpy impact value equal to that of Member X.

(3) Static Fracture Toughness Value

Figure 14:
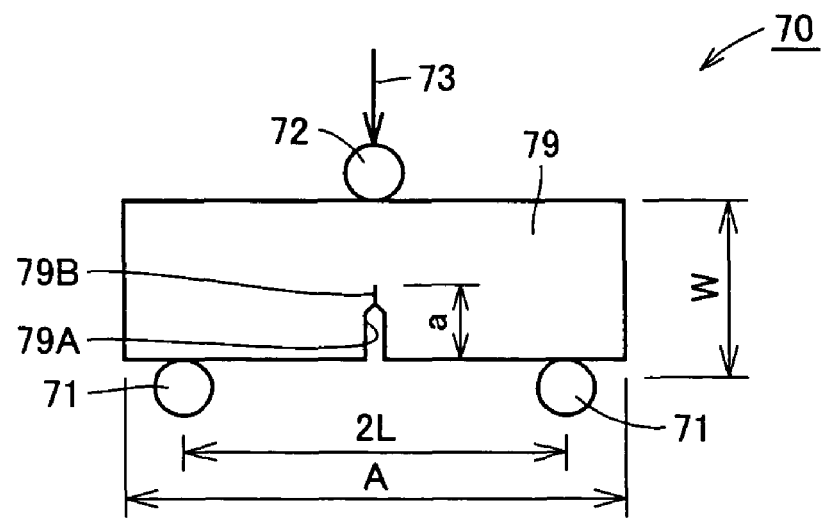
FIG. 14 is a diagram to describe a test method to measure static fracture toughness values.

The testing method for measurement of the static fracture toughness value will be described hereinafter with reference to FIG. 14.

A static fracture toughness value measurement apparatus 70 includes lower support rollers 71, 71 and a weight load roller 72. A test piece 79 for the static fracture toughness test has a rectangular solid configuration of A in length and W in height. A notch 79A is formed inward at one of the planes located in the longitudinal direction. Notch 79A is formed as a groove transversing that one plane located in the longitudinal direction so as to run across from one end to the other end of that one plane in a direction orthogonal to the longitudinal direction. Further, a pre-crack 79B of approximately 1 mm in length is formed at the leading end of notch 79A. The distance from the surface of that one plane located in the longitudinal direction up to the tip of pre-crack 79B is "a".

The testing procedure will be described hereinafter. Two lower support rollers 71 and 71 were arranged at the interval of 2 L. Test piece 79 was set with that one plane located in the longitudinal direction as the bottom, forming contact with lower support rollers 71 and 71. At this stage, test piece 79 was set so that the distance from the opening of notch 79A to each of lower support rollers 71 and 71 is equal. Weight load roller 72 was set so as to form contact with the plane opposite to that one plane located in the longitudinal direction. Weight load roller 79 was disposed at a site closest to the tip of pre-crack 79B formed at the other side plane. The load was gradually applied in the weight load direction 73 indicated by an arrow (three-point bending). The load when test piece 79 fractured (breaking load P) was measured. Equation (D) set forth below was employed for the calculation of fracture toughness value ($K_{1C}$ value). The results of the tests are shown in Table 5.

$$K_{1C}=(PL\sqrt{a}/BW^2)\{5.8-9.2(a/W)+43.6(a/W)^2-75.3(a/W)^3+77.5(a/W)^4\} \quad (D)$$

TABLE 5

| Member | No. of Tests | $K_1C$ (MPa√m) | Ratio of $K_{1C}$ |
|---|---|---|---|
| Member X | 3 | 16.3 | 1.0 |
| Member Y | 3 | 16.1 | 1.0 |
| Member Z | 3 | 18.9 | 1.2 |

It is appreciated from Table 5 that no difference was observed in the fracture toughness value between Members X and Y that are comparative examples since the pre-crack depth "a" is larger than the depth of the carbonitrided layer. In contrast, Member Z corresponding to the present example exhibited a fracture toughness value that is approximately 1.2 times that of Members X and Y.

(4) Fracture Stress Value

The testing method is similar to that of Example 1. The results of the test are shown in Table 6.

TABLE 6

| Member | No. of Tests | Fracture Stress Value (kgf) | Ratio of Fracture Stress Value |
|---|---|---|---|
| Member X | 3 | 4200 | 1.00 |
| Member Y | 3 | 3500 | 0.84 |
| Member Z | 3 | 4300 | 1.03 |

It is appreciated from Table 6 that Member Y subjected to a conventional carbonitriding process exhibited a fracture stress value that is slightly lower than that of Member X subjected to general quenching. Member Z of the present example exhibited a fracture stress value higher than that of Member Y, and of a level by no means inferior to that of Member X.

(5) Secular Dimensional Distortion Rate

The dimensional distortion rate of test pieces retained for 500 hours at the temperature of 130° C. was measured. The results of the measurements are shown in Table 7 set forth below together with the surface hardness and the retained austenite amount (values measured at the depth of 50 μm from the surface of the test piece).

TABLE 7

| Member | No. of Tests | Surface Hardness | Retained Austenite Amount (volume %) | Dimensional Distortion Rate ($\times 10^{-5}$) | Ratio of Dimensional Distortion Rate |
|---|---|---|---|---|---|
| Member X | 3 | 62.5 | 8.8 | 18 | 1.0 |
| Member Y | 3 | 63.6 | 30.5 | 35 | 1.9 |
| Member Z | 3 | 60.0 | 11.8 | 22 | 1.2 |

It is appreciated from Table 7 that Member Z of the present example has the dimensional distortion rate greatly suppressed as compared to that of Member Y having a high amount of retained austenite.

(6) Rolling Contact Fatigue Life Under Contaminated Lubricant Environment

Using a ball bearing 6206 (defined in JIS B 1513), the rolling contact fatigue life was evaluated under contaminated lubricant environment in which a predetermined amount of predetermined foreign particles were mixed into the lubricant. The present rolling contact fatigue life test corresponds to a rolling contact fatigue life test of the raceway of a rolling-contact shaft with a joint claw, particularly a rolling contact fatigue life test with respect to a surface-origin type flaking. The test conditions are shown in Table 8 and the test result are shown in Table 9.

TABLE 8

| Load | Fr = 6.86 kN |
|---|---|
| Contact pressure | Pmax = 3.2 GPa |
| Rotational rate | 2000 rpm |
| Lubrication | Turbine 56 oil bath |

TABLE 8-continued

| Foreign particle content | 0.4 g/1000 cc |
|---|---|
| Foreign particles | size 100–180 μm, hardness HV800 |

TABLE 9

| Member | $L_{10}$ Life (hours) | Ratio of $L_{10}$ |
|---|---|---|
| Member X | 20.0 | 1.0 |
| Member Y | 50.2 | 2.5 |
| Member Z | 45.8 | 2.3 |

It is appreciated from Table 9 that Member Y subjected to a conventional carbonitriding process exhibited a life time that is approximately 2.5 times that of Member X not subjected to a carbonitriding process. Member Z of the present example exhibited a life time that is approximately 2.3 times that of Member X. Member Z of the present example has a fine steel structure (microstructure) due to the smaller austenite grains in the nitrogen-enriched layer while the amount of retained austenite is lower than that of Member Y of the comparative example. As a result, Member Z of the present example exhibited a long life substantially equal to that of Member Y of the comparative example.

From the results set forth above, it is appreciated that Member Z, i.e. the present example, can satisfy at the same time the three requirements of increasing the rolling contact fatigue life, improving the fracture stress value, and reducing the secular dimensional distortion rate, which could not be readily achieved by the conventional carbonitriding process.

Example 3

Example 3 of the present invention will be described hereinafter. Using SUJ2, SCM 420 and S53C of the JIS as the raw materials, rolling-contact shafts with joint claws at one end were produced. Tests to investigate the influence of the heat treatment history in the heat treatment step on various properties of a rolling-contact shaft with a joint claw were conducted. The investigated properties were: (1) austenite grain size, (2) hydrogen content at joint claw, (3) amount of retained austenite at raceway, (4) nitrogen content at raceway, (5) surface hardness at joint claw, and (6) torsional strength of joint claw.

Five specimens labeled as Examples A and B (rolling-contact shaft with joint claw of present invention) and Comparative Examples C, D and E (conventional rolling-contact shaft with joint claw) were employed for the test. The heat treatment history of each specimen is as set forth below.

Examples A and B were subjected to a heat treatment according to a heat treatment pattern similar to that of FIG. 5. Specifically, the specimens of Examples A and B were retained for 150 minutes at the temperature of 850° C. in a mixture gas atmosphere of RX gas and ammonia (NH₃) gas to be carbonitrided, followed by primary quenching from 850° C. that is the carbonitriding process temperature. Then, the specimens were subjected to secondary quenching by being cooled rapidly (oil cooling) after being retained for 60 minutes at the temperature of 800° C. that is lower than the carbonitriding process temperature. Then, the specimens were subjected to tempering by being retained for 120 minutes at the temperature of 180° C. Then, only the portion around the joint claw was subjected to high frequency induction tempering.

Figure 15:
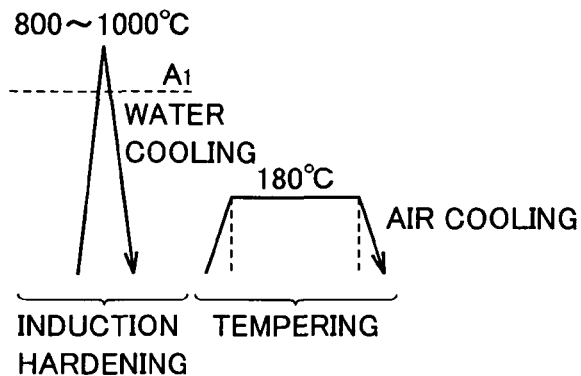
FIG. 15 represents a pattern of heat treatment carried out on Comparative Example C.
Figure 16:
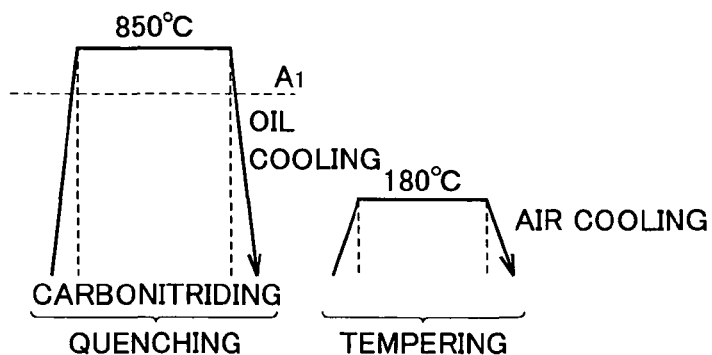
FIG. 16 represents a pattern of heat treatment carried out on Comparative Example D.
Figure 17:
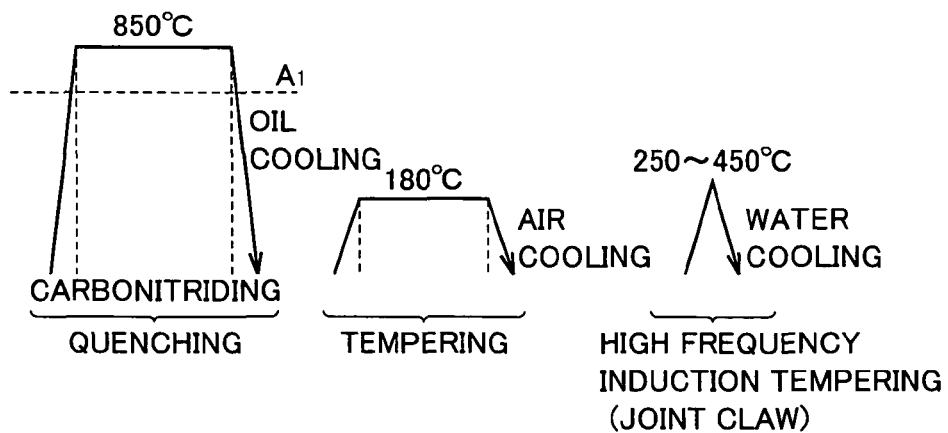
FIG. 17 represents a pattern of heat treatment carried out on Comparative Example E.

In FIGS. 15-17, the horizontal direction corresponds to time with the lapse in the rightward direction, whereas the vertical direction corresponds to temperature, representing a higher temperature as a function of height. Comparative Example C was subjected to a heat treatment according to the heat treatment pattern of FIG. 15. Specifically, Comparative Example C was quench-hardened by being heated to approximately 900° C. by high frequency induction heating, and then cooled rapidly (water cooling). Then, the specimen was tempered by being retained for 120 minutes at the temperature of 180° C. Comparative Example D was subjected to a heat treatment according to the heat treatment pattern of FIG. 16. Specifically, the specimen was carbonitrided by being retained for 150 minutes at the temperature of 850° C. in a mixture gas atmosphere of RX gas and ammonia (NH$_3$) gas, and then subjected to quench-hardening by being cooled rapidly (oil cooling) from 850° C. that is the carbonitriding process temperature. Then, the specimen was retained for 120 minutes at the temperature of 180° C. to be tempered. Comparative Example E was subjected to a heat treatment according to the heat treatment pattern of FIG. 17. Specifically, the specimen was carbonitrided by being retained for 150 minutes at the temperature of 850° C. in a mixture gas atmosphere of RX gas and ammonia (NH$_3$) gas, and then subjected to quench-hardening by being cooled rapidly (oil cooling) from 850° C. that is the carbonitriding process temperature. The specimen was further subjected to tempering by being retained for 120 minutes at the temperature of 180° C. Then, only the joint claw portion was subjected to high frequency induction tempering.

Figure 18:
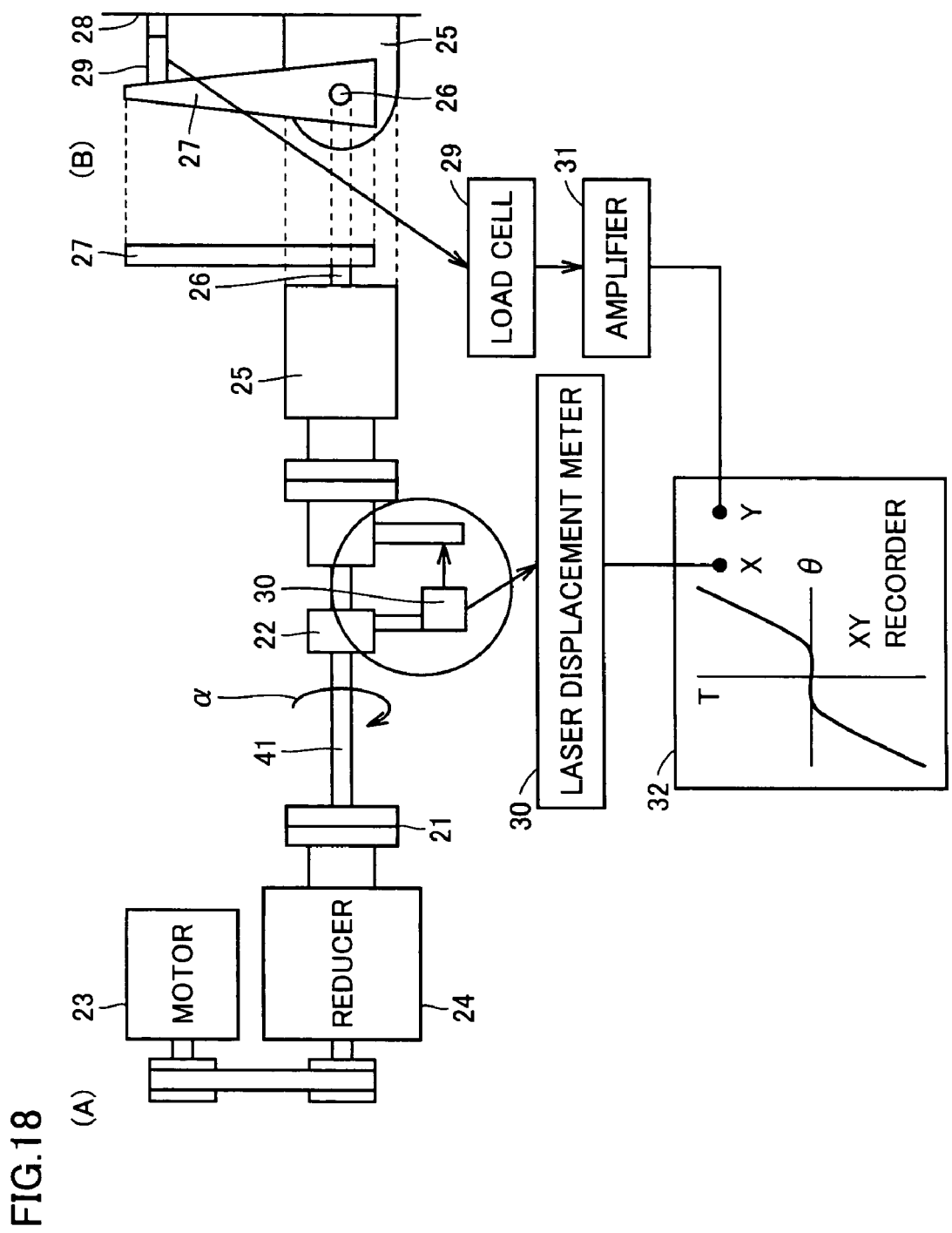
FIG. 18 is a schematic diagram to describe a configuration of a torsional strength test machine.

The testing method will be described hereinafter. Investigation on the austenite grain size, the hydrogen content at the joint claw, and the amount of retained austenite at the raceway were carried out employing the methods similar to those of Example 1, provided that the amount of austenite at the raceway was measured at the region of 50 μm in depth from the surface of the raceway. Measurement of nitrogen content of the raceway was taken at the region of 50 μm in depth from the surface, using an EPMA. The surface hardness at the joint claw was measured under the condition of a load of 1 kgf using a Vicker's hardness meter. The method of measuring the torsional strength of the joint claw will be described with reference to FIGS. 18 and 19. In FIG. 18, (A) and (B) correspond to a schematic front view and a schematic right side view, respectively, of a torsional strength test machine.

Referring to FIG. 18, a torsional strength test machine includes a test piece fixture chuck 21 to secure a rolling-contact shaft 41 with a joint claw that is the test piece, a motor 23, and a reducer 24 at one side (the left side in FIG. 18(A)), as well as a fitting chuck 22 to fit with a joint claw 42 of rolling-contact shaft 41, a support 25, a chuck shaft 26, an arm 27, a fixture base 28, a load cell 29, and a laser displacement meter 30 at the other side (the right side in FIG. 18(A)). Fixture chuck 21 is connected to motor 23 via reducer 24. A power supply not shown to supply power to motor 23 is connected to motor 23. Fitting chuck 22 is rotatably supported by support 25, and held so as to allow movement in the axial direction. Fitting chuck 22 is connected to arm 27 via chuck shaft 26. Arm 27 is connected with an immobile fixture base 28 via load cell 29, as shown in FIG. 18(B). A laser displacement meter is installed at fitting chuck 22, as shown in FIG. 18(A). Load cell 29 is connected to an XY recorder 32 via an amplifier 31. Laser displacement meter 30 is also connected to XY recorder 32.

Figure 19:
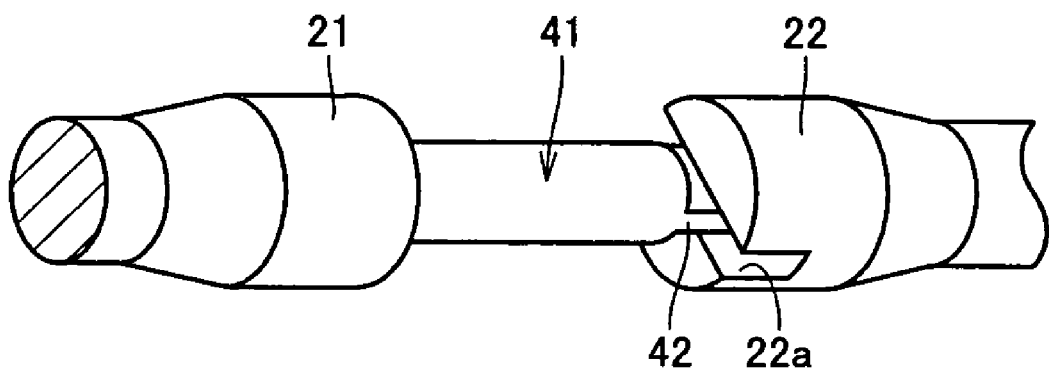
FIG. 19 represents in detail the neighborhood of a joint claw.

The procedure of the torsional strength test will be described hereinafter. Referring to FIG. 19, rolling-contact shaft 41 with a joint claw is arranged such that joint claw 42 formed at one end thereof fits with a slit 22a formed at the leading end of fitting chuck 22 and the other end of rolling-contact shaft 41 is fixedly held by fixture chuck 21. A semicircular notch (not shown) having a diameter that is approximately 3/1 the claw width is formed at the leading end plane of joint claw 42. Measurement of the surface hardness of joint claw 42 was taken at a site distant from the bottom of the semicircular notch by 0.5 mm at the side opposite to the leading end. The rotation of motor 23 to which power is supplied from a power supply not shown is transmitted to fixture chuck 21 while the rotation is reduced by reducer 24, whereby rotational torque is applied in the direction of arrow α on rolling-contact shaft 41 with a joint claw. The rotation angle θ measured by laser displacement meter 30 is recorded at XY recorder 32 as the X value. Torque value T measured by load cell 29 is amplified by amplifier 31 and recorded at XY recorder 32 as the Y value. The torsional strength of joint claw 42 is calculated based on the measurement results recorded at XY recorder 32. The test was carried out under the rotational rate condition of 0.02 revolutions/min.

The test results are shown in Table 10, and will be described hereinafter.

TABLE 10

| No. | Material | Heat Treatment | Austenite Grain Size (JIS Grain Size No.) | Hydrogen Content at Joint Claw (mass ppm) | Retained Austenite at Raceway (volume %) | Nitrogen Content at Raceway (mass %) | Surface Hardness at Joint Claw (HV) | Torsional Strength at Joint Claw (N · m) |
|---|---|---|---|---|---|---|---|---|
| Example A | SUJ2 | FIG. 5 | 12 | 0.28 | 18 | 0.40 | 640 | 53 |
| Example B | SCM420 | FIG. 5 | 11 | 0.32 | 22 | 0.42 | 580 | 48 |
| Comparative Example C | S53C | FIG. 15 | 7 | 0.18 | 5 | 0 | 680 | 38 |
| Comparative Example D | SUJ2 | FIG. 16 | 9 | 0.68 | 30 | 0.50 | 730 | 24 |
| Comparative Example E | SUJ2 | FIG. 17 | 9.5 | 0.46 | 28 | 0.50 | 620 | 44 |

(1) Austenite Grain Size

Examples A and B of the present invention exhibited the grain size number of at least 11, indicating significant fine grains. Comparative Example C corresponding to a conventional rolling-contact shaft with a joint claw having induction hardening effected only around the raceway, and Comparative Examples D and E subjected to the conventional carbonitriding process and quenching exhibited the grain size number of 7 to 9.5, indicating grains larger than those of Examples A and B.

(2) Hydrogen Content at Joint Claw

All the specimens other than Comparative Example D exhibited the value of not more than 0.5 mass ppm. Comparative Example D exhibited a high value of 0.68 mass ppm. This is probably because of the fact that hydrogen generated by the decomposition of ammonia, methane, ethane, and the like included in the atmosphere during the carbonitriding process and entering steel was discharged outside by the high frequency induction tempering carried out at the last stage of the heat treatment step for Example A, Example B, and Comparative Example E, whereas the generated hydrogen was not discharged for Comparative Example D. Further, for Examples A and B, hydrogen entered during the primary quenching process is once discharged during the heating process in secondary quenching. Since only a small amount of hydrogen entering during the heating process carried out at 800° C. that is lower than the carbonitriding temperature and for 30 minutes that is shorter than the carbonitriding period remains in the steel at the stage previous to high frequency induction tempering, a further lower value of not more than 0.35 mass ppm is exhibited. Comparative Example C subjected to only high frequency induction hardening and not subjected to carbonitriding exhibited a low hydrogen content of 0.18 mass ppm.

(3) Amount of Retained Austenite at Raceway

Examples A and B of the present invention exhibited the value of 18-22 volume %, containing retained austenite of an amount preferable for improving the rolling contact fatigue life (11-25 volume %). Comparative Example C exhibited the value of 5 volume %, which is lower than the preferable range. Comparative Examples D and E exhibited the values of 28-30 volume %, which is outside the preferable range.

(4) Nitrogen Content at Raceway

Comparative Examples C and E exhibited the value of 0.50 mass %, whereas Examples A and B of the present invention exhibited slightly lower values of 0.40-0.42 mass %. This is probably because of the fact that Examples A and B subjected to carbonitriding process, likewise Comparative Examples D and E, were further heated to 800° C. lower than the carbonitriding process temperature in secondary quenching. It is to be noted that Comparative Example C not subjected to carbonitriding exhibited the value of 0 mass %.

(5) Surface Hardness at Joint Claw

Examples A and B of the present invention as well as Comparative Examples C and E exhibited the values of 580-680 HV, which is within the preferable range (520-720 HV) for improving the strength at the joint claw. Comparative Example D exhibited the value of 730 HV, which is outside the preferable range. There is a possibility that a joint claw with this hardness may not sufficiently serve its purpose.

(6) Torsional Strength of Joint Claw

Examples A and B of the present invention exhibited the values of 48-53 N·m, ensuring the torsional strength required for the joint claw. Comparative Examples C and E exhibited the values of 38-44 N·m, which is of the level required for the joint claw, though lower than the values of Examples A and B. Comparative Example D exhibited the value of 24 N·m, not satisfying the required level of torsional strength. The average of 50 specimens each was taken as the torsional strength.

Figure 20:
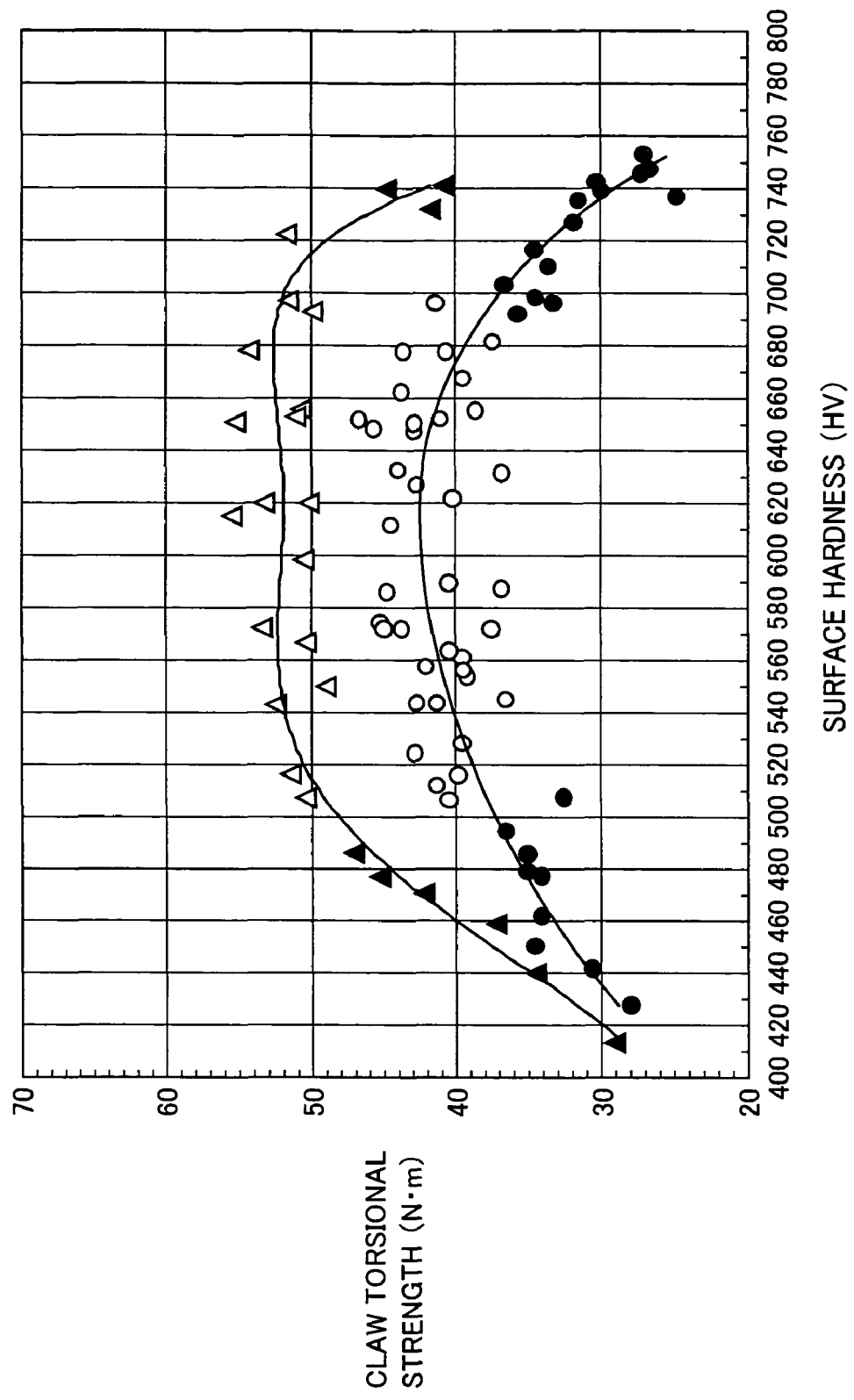
FIG. 20 represents the relationship between the surface hardness and torsional strength at the joint claw.

Test pieces corresponding to Example A and Comparative Example E having the surface hardness of the joint claw altered by changing the conditions of the high frequency induction tempering carried out at the last stage in the heat treatment step were produced for the test to investigate the effect of the surface hardness of the joint claw on the torsional strength of the joint claw. In FIG. 20, the triangles represent Example A of the present invention whereas the circles represent Comparative Example E. The open triangles and open circles correspond to values of high torsional strength and in a stable region. The solid triangles and solid circles correspond to values of reduced torsional strength. The results of the test will be described with reference to FIG. 20.

It is appreciated from FIG. 20 that the torsional strength of Example A exceeds the torsional strength of Example E in all the hardness ranges that were tested. This is probably because of the fact that Comparative Example E includes austenite grains of grain number 9.5 in the nitrogen-enriched layer and a joint claw with the hydrogen content of 0.46 mass ppm, whereas Example A includes fine austenite grain as small as grain number 12 in the nitrogen-enriched layer and a hydrogen content as low as 0.28 mass ppm. It is appreciated that the torsional strength is high and stable at the range of 520-720 HV for Example A and in the range of 520-680 HV for Comparative Example E. This is probably because of the fact that, if the hardness of the joint claw is too low, plastic deformation will occur at the joint claw to cause reduction in the torsional strength, and if the hardness of the joint claw is too high, generation and spread of a crack will be facilitated to cause reduction in the torsional strength. Thus, it is appreciated that, in order to ensure a high torsional strength, the surface hardness at the joint claw is preferably at least 520 HV and at most 720 HV, more preferably at least 520 HV and at most 680 HV.

The rolling-contact shaft with a joint claw of the present invention is particularly suitable for a steel-made rolling-contact shaft including a joint claw at one end and having a portion of the outer cylindrical surface functioning as the raceway of a rolling element of a bearing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rolling-contact shaft with a joint claw formed of steel, including the joint claw at one end, and having a portion of an outer cylindrical surface functioning as a raceway of a rolling element of a bearing, wherein
    said joint claw is subjected to tempering by induction heating,
    a nitrogen-enriched layer is formed at a surface layer of said joint claw,
    a grain size number of austenite grains in said nitrogen-enriched layer exceeds number 10,
    a hydrogen content is at most 0.5 ppm,
    a surface hardness of said claw is at least 520 HV and at most 680 HV, and
    a surface hardness at the raceway is set to 730 HV or above.

2. The rolling-contact shaft with a joint claw according to claim 1, wherein at least a portion of said nitrogen-enriched layer where a surface functioning as said raceway has a retained austenite amount of at least 11 volume % and at most 25 volume %.

3. The rolling-contact shaft with a joint claw according to claim 1, wherein a nitrogen content of said nitrogen-enriched layer is at least 0.1 mass % and at most 0.7 mass %.

4. The rolling-contact shaft with a joint claw according to claim 1, wherein said steel includes at least 0.1 mass % and at most 1.2 mass % of carbon, and at least 0.2 mass % and at most 2.0 mass % of chromium at a region other than said surface layer.

* * * * *